US007818246B2

(12) United States Patent
Cushing et al.

(10) Patent No.: US 7,818,246 B2
(45) Date of Patent: Oct. 19, 2010

(54) SYSTEMS AND METHODS FOR ORDER ANALYSIS, ENRICHMENT, AND EXECUTION

(75) Inventors: David Charles Cushing, Lexington, MA (US); Tomas Bok, Somerville, MA (US); Amit Manwani, New York, NY (US); Mark Francis Mancini, New York, NY (US)

(73) Assignee: Barclays Capital Inc., New York, NY (US)

( * ) Notice: Subject to any disclaimer, the term of this patent is extended or adjusted under 35 U.S.C. 154(b) by 743 days.

(21) Appl. No.: 11/398,971

(22) Filed: Apr. 5, 2006

(65) Prior Publication Data

US 2006/0259394 A1     Nov. 16, 2006

Related U.S. Application Data

(60) Provisional application No. 60/668,740, filed on Apr. 5, 2005.

(51) Int. Cl.
*G06Q 40/00* (2006.01)
(52) U.S. Cl. ...................................... 705/37; 705/36 R
(58) Field of Classification Search .................. 705/35, 705/36 R, 37
See application file for complete search history.

(56) References Cited

U.S. PATENT DOCUMENTS

| 6,408,282 | B1 * | 6/2002 | Buist ......................... 705/36 R |
| 7,308,428 | B1 * | 12/2007 | Federspiel et al. ......... 705/36 R |
| 7,590,587 | B2 * | 9/2009 | Duquette ..................... 705/37 |
| 2002/0052827 | A1 * | 5/2002 | Waelbroeck et al. .......... 705/37 |
| 2002/0133456 | A1 * | 9/2002 | Lancaster et al. ............. 705/37 |
| 2002/0194106 | A1 * | 12/2002 | Kocher ........................ 705/37 |
| 2003/0154157 | A1 * | 8/2003 | Kokis et al. .................. 705/37 |
| 2003/0233306 | A1 * | 12/2003 | Madhavan et al. ............ 705/37 |
| 2003/0236738 | A1 * | 12/2003 | Lange et al. .................. 705/37 |

(Continued)

FOREIGN PATENT DOCUMENTS

WO    WO 2006/105576    * 10/2006

(Continued)

OTHER PUBLICATIONS

Anonymous, ABN Amro selects SunGard's Credient for credit risk management. pp. 1-2. Apr. 25, 2003, www.Finextra.com.*

*Primary Examiner*—James P Trammell
*Assistant Examiner*—B. Joan Amelunxen
(74) *Attorney, Agent, or Firm*—Morgan Lewis & Bockius LLP

(57) ABSTRACT

A preferred embodiment of the invention provides an interface providing a model-driven projection of various order execution statistics based on the exact strategy (channel, algorithm, and parameters) that is selected by a user. In at least one embodiment, the interface is linked to at least order execution system and comprises an order execution display. In one embodiment, the invention comprises a computer system operable to display a graphical user interface comprising (a) a pre-trade analysis component for displaying market intelligence information regarding one or more specified securities; and (b) a strategy selection component for displaying order execution strategies for selection by a user and that comprises (i) an order execution component for routing a selected order execution strategy to an order execution system; (ii) an interface for enabling a user to specify trading strategies and strategy requirements; and (iii) a display for displaying projected order completion information.

60 Claims, 31 Drawing Sheets

U.S. PATENT DOCUMENTS

| | | | |
|---|---|---|---|
| 2004/0064397 A1* | 4/2004 | Lynn et al. | 705/37 |
| 2004/0215549 A1* | 10/2004 | Madhavan et al. | 705/37 |
| 2004/0254874 A1* | 12/2004 | Bok et al. | 705/37 |
| 2005/0004852 A1* | 1/2005 | Whitney | 705/35 |
| 2005/0015321 A1* | 1/2005 | Vindekilde | 705/37 |
| 2005/0015323 A1* | 1/2005 | Myr | 705/37 |
| 2005/0102218 A1* | 5/2005 | Sargent et al. | 705/37 |
| 2005/0102220 A1* | 5/2005 | Stackpole | 705/37 |
| 2009/0112775 A1* | 4/2009 | Chiulli et al. | 705/36 R |

FOREIGN PATENT DOCUMENTS

WO    WO 2008/153909    * 12/2008

* cited by examiner

FIG. 10

Browser window titled "https://livestage.lehman.com - Order Confirmat..." showing:

LEHMAN BROTHERS | LehmanLive Analytics Ser Desk H

Sending following order to Lehman Brothers?

B 120,000 (SIRIUS SATELLITE RADIO INC) to LMX
(Lehman Model Execution)
Strategy=VWAP Time=09:30:00-16:00:00

[Yes] [No]

BUY | MICROSOFT CORP UQ (USD)
MSFT | Order: 50,000 shares (20% slice of original order)
| Channel: LMX [VWAP from 10:30am - 3:45pm]
16:31:44 | Parameters: Price Limit: $27.00; Volume Limit 10%

FIG. 12

| Last | Bid | Ask | Price Data | VWAP |
|---|---|---|---|---|
| 26.78 | 26.77 | 26.79 | O 26.94    C -- | 26.86 |
| -0.33% | 10 | 4 | H 27.10    L 26.82 | |

| time | % filled | avg Price | last | unrealized | % volume |
|---|---|---|---|---|---|
| 4:31:44pm | 100% | $26.831 | $26.75 | $26.831 | 0.4% | relative performance   avg price = $26.831   ☐ include unrealized?

| | benchmark value | performance (cps) | performance (bps) | performance (dollars) |
|---|---|---|---|---|
| horizon VWAP | $26.86 | +3.3 | +12.3 | $2,480.49 |
| full-day VWAP | $26.87 | +3.35 | +13.0 | $2,518.07 |
| market open (PRISE-adjusted) | $26.94 $26.987 | +10.9 +14.2 | +40.5 +52.8 | $8,193.14 $10,673.63 |
| market close | $26.78 | -5.1 | -19.0 | -$3,833.49 |
| horizon start (PRISE-adjusted) | $26.94 $26.987 | +10.9 +14.2 | +40.5 +52.8 | $8,193.14 $10,673.63 |
| horizon end | $26.76 | -7.1 | -26.5 | -$5,336.31 |

FIG. 15 summary of trading conditions

| | actual | expected | delta |
|---|---|---|---|
| share volume | 3,272,200 | 5,810,900 | -43% |
| average spread | 2.2 cents | 1.8 cents | +22% |
| volatility | 1.3% | 1.2% | +8% |

FIG. 16

LEHMAN BROTHERS Attaché

| Pre-Trade | Execution | Post-Trade | View All Orders |

| | Total | | | | Allocated to Lehman | | | |
|---|---|---|---|---|---|---|---|---|
| | # | Shares | USD Value | % Weight | Shares | % Alloc | USD Value | Filled | % Filled |
| Buy | 12 | 127,200 | 5,117,256 | 77.0% | 50,000 | 39.3% | 2,006,150 | 22,400 | 44.8% |
| Sell | 4 | 38,000 | 1,528,740 | 23.0% | 20,000 | 52.6% | 802,460 | 12,800 | 64.0% |
| Short | 0 | 0 | 0 | 0.0% | 0 | 0.0% | 0 | 0 | 0.0% |
| TOTAL | 16 | 165,200 | 6,645,996 | 100.0% | 70,000 | 42.4% | 2,808,610 | 35,200 | 50.3% |

View: ○ Parent Orders
● Executed Orders

Order Attributes

| Symbol | Side | Shares | Strategy | % Filled | Slippage | Start Time |
|---|---|---|---|---|---|---|
| MSFT | B | 5,100 | VWAP to 4pm | 68.6% | [V] +1.5bps | 9:37am |
| F | S | 1,700 | VWAP to 4pm | 58.8% | [V] -2.4bps | 9:37am |
| IBM | B | 1,400 | Target Strike / High | 100.0% | [IS] +1.5bps | 10:04am |
| JDSU | S | 1,200 | With Volume / 20% | 100.0% | [IS] -1.7bps | 11:51am |
| MRK | S | 1,100 | CAT | 63.6% | [IS] -4.2bps | 12:34am |
| GM | B | 1,000 | CAT | 100.0% | [IS] -10.8bps | 12:35am |
| IP | S | 1,500 | VWAP to 4pm | 20.0% | [V] -0.3bps | 1:09pm |
| XOM | S | 2,700 | VWAP to 4pm | 14.8% | [V] +3.9bps | 1:09pm |
| GS | B | 1,400 | VWAP to 4pm | 21.4% | [V] +5.1bps | 1:09pm |
| BA | S | 1,600 | With Volume / 20% | 100.0% | [IS] +2.bps | 1:16pm |
| JNJ | B | 1,200 | With Volume / 40% | 100.0% | [IS] -4.4bps | 1:22pm |
| ERTS | B | 3,200 | Target Strike / High | 0.0% | [IS] -9.6bps | 1:31pm |

[Cancel] [Cancel All] [Correct] [Drill Down]

FIG. 29

|  | Projected Completion Characteristics | | | |
| --- | --- | --- | --- | --- |
|  | Original Projection | Realized | Projected (Residual) | Projected (Total) |
| Completion % | 100% | 12% | 88% | 100% |
| Execution Cost | -10.9 bps | -5.3 bps | -14.4 bps | -13.3 bps |
| Execution Risk | 44 bps | 0 bps | 35 bps | 31 bps |
| Duration | 210 min | 30 min | 180 min | 210 min |
| Completion Time | 1:00 PM | NA | 1:00 PM | 1:00 PM |
| Consumption Rate | 9% | 11% | 9% | 9% |

SYSTEMS AND METHODS FOR ORDER ANALYSIS, ENRICHMENT, AND EXECUTION

CROSS-REFERENCE TO RELATED APPLICATIONS

This application claims the benefit of U.S. Provisional Pat. App. No. 60/668,740, filed Apr. 5, 2005. The entire contents of that provisional application are incorporated herein by reference.

SUMMARY

Traders tend to focus their workflow around their Order Management System (OMS), and tend to be reluctant to leave their OMS environment and switch focus to any stand-alone product. Therefore, in order to provide quantitative products such as pre-trade or post-trade analytics or access to automated trading systems to clients, there is a need to integrate these tools directly into the user's OMS, rather than provide a stand-alone solution. Traders also require decision support to help them choose the most appropriate execution strategy for a given order or basket of orders. Therefore, there is a need to embed quantitative models and analytics directly within the trading workflow so that traders can utilize these analytics to "audition" different execution channels or automated trading algorithms. Traders would do so by first using a control panel to set strategy parameter settings (execution channel, algorithm choice, trade horizon, urgency, and other parameters), and then viewing the projected results (e.g., trading cost, risk, and completion time) for their trade given their current set of parameter choices. Once the trader is happy with the final set of parameter choices, it is preferable to allow them to immediately generate an order with all of their choices clearly specified and automatically send this order to a market or broker for execution. This minimizes extra steps for the trader and streamlines their workflow.

In one aspect, the present invention comprises a method and system for security order execution. One preferred embodiment comprises a stand-alone browser-based application that allows stock traders to exit an Order Management System (OMS), Execution Management System (EMS), or other order execution system, obtain pre-trade analysis, decide on a trading strategy, and then execute the order through one of a number of channels, including Manual Execution, Algorithm Execution, or Direct Market Access. One embodiment comprises three components: Pre-trade Analytics, Strategy Selection Tool, and Algorithm Parameter Selection interfaces. Other embodiments include order monitoring and post-trade analysis functionality. Preferred embodiments operate via integration with OMS/EMS applications.

A preferred embodiment of the invention provides an interface providing a model-driven projection of various order execution statistics based on the exact strategy (channel, algorithm, and parameters) that is selected by a user. In at least one embodiment, the interface is linked to at least order execution system and comprises an order execution display.

In one aspect, the invention comprises a computer system operable to display a graphical user interface comprising a pre-trade analysis component and an strategy selection component, wherein the pre-trade analysis component is operable to display market intelligence information regarding one or more securities; and the strategy selection component is operable to display one or more order execution strategies for selection by a user, and comprises an order execution component operable to route a selected order execution strategy to an order execution system; wherein the strategy selection component further comprises an interface for enabling a user to specify one or more trading strategies and strategy requirements; and wherein the strategy selection component further comprises a display operable to display projected order completion information based on the user-specified one or more trading strategies and strategy requirements.

In various embodiments: (1) the pre-trade analysis component is operable to receive from an order management system data identifying the one or more securities; (2) the pre-trade analysis component is operable to display liquidity information regarding the one or more securities; (3) the pre-trade analysis component is operable to display performance information regarding the one or more securities; (4) the pre-trade analysis component is operable to display execution risk information regarding the one or more securities; (5) the strategy selection component is operable to display order execution strategy information for the one or more securities; (6) the strategy selection component comprises an interface for enabling a user to specify one or more order timing requirements; (7) the strategy selection component comprises an interface for enabling a user to specify one or more order execution channels; (8) the strategy selection component comprises an interface for enabling a user to send an order directly to an order execution system; (9) the strategy selection component comprises a basic order information display; (10) the strategy selection component comprises an interface for enabling a user to edit at least one of: order size and price limit; (11) the interface for enabling a user to specify one or more trading strategy requirements is operable to enable a user to choose one or more trading strategies comprising one or more VWAP and TWAP strategies; (12) the interface for enabling a user to specify one or more trading strategy requirements is further operable to allow the user to specify one or more trading horizons for the user-chosen VWAP and TWAP strategies; (13) the interface for enabling a user to specify one or more trading strategy requirements is operable to enable the user to choose one or more trading strategies comprising one or more With Volume strategies; (14) the interface for enabling a user to specify one or more trading strategy requirements is further operable to allow the user to specify one or more volume participation target rates for the user-chosen With Volume strategies; (15) the interface for enabling a user to specify one or more trading strategy requirements is operable to enable the user to choose one or more trading strategies comprising one or more Target Strike strategies; (16) the interface for enabling a user to specify one or more trading strategy requirements is further operable to allow the user to specify one or more urgency levels for the user-chosen Target Strike strategies; (17) the interface for enabling a user to specify one or more trading strategy requirements is operable to enable a user to specify a participation ceiling; (18) the projected order completion information comprises one or more of: completion percent, execution cost, execution risk, duration, completion time, and consumption rate; (19) the projected order completion information comprises residual order information; (20) the residual order information comprises at least one of: residual percent, residual cost, residual risk, and total risk; (21) the projected order completion information comprises impact versus execution risk tradeoff information; (22) the impact versus execution risk tradeoff information is displayed as a chart; (23) the projected order completion information comprises impact cost information; (24) the impact cost information is displayed as a chart; (25) the system further comprises a monitoring component operable to display order progress and performance information; (26) the monitoring component is operable to display order and slice information comprising symbol, side, slice size, and strategy; (27) the monitoring component is operable to display quote information and VWAP; (28) the monitoring component is operable to display real time order progress data; (29) the real time order progress data comprises at least one of: percent filled, average price, unrealized average price, and percent consumption; (30) the monitoring component is operable to display a trading conditions summary; (31) the trading conditions summary comprises information regarding at least one of: volume, volatility, and spread over horizon; (32) the monitoring component is operable to display a chart showing price versus VWAP; (33) the monitoring component is operable to display a chart showing actual versus expected volume; and (34) the system further comprises a view all orders component operable to display order progress and performance information for a plurality of orders.

BRIEF DESCRIPTION OF THE DRAWINGS

FIG. 10 depicts an exemplary confirmation dialog display.

FIG. 12 depicts an exemplary order/slice information display.

FIG. 13 depicts an exemplary quote line display.

FIG. 14 depicts an exemplary progress data display.

FIG. 15 depicts an exemplary performance display.

FIG. 16 depicts an exemplary summary of trading conditions display.

FIG. 29 depicts another exemplary View All Orders tab/display.

FIG. 30 depicts an exemplary projection execution display.

FIG. 31 depicts an exemplary pre-trade summary for a basket of securities.

DETAILED DESCRIPTION OF PREFERRED EMBODIMENTS

Various embodiments of the present invention are described below.

One embodiment (Single Stock Environment ("SSE")) comprises a combination of two components: pre-trade analytics and strategy selection tool. Other embodiments may comprise order monitoring and post-trade analysis capabilities. The invention preferably operates via integration with OMS/EMS applications.

Figure 1:
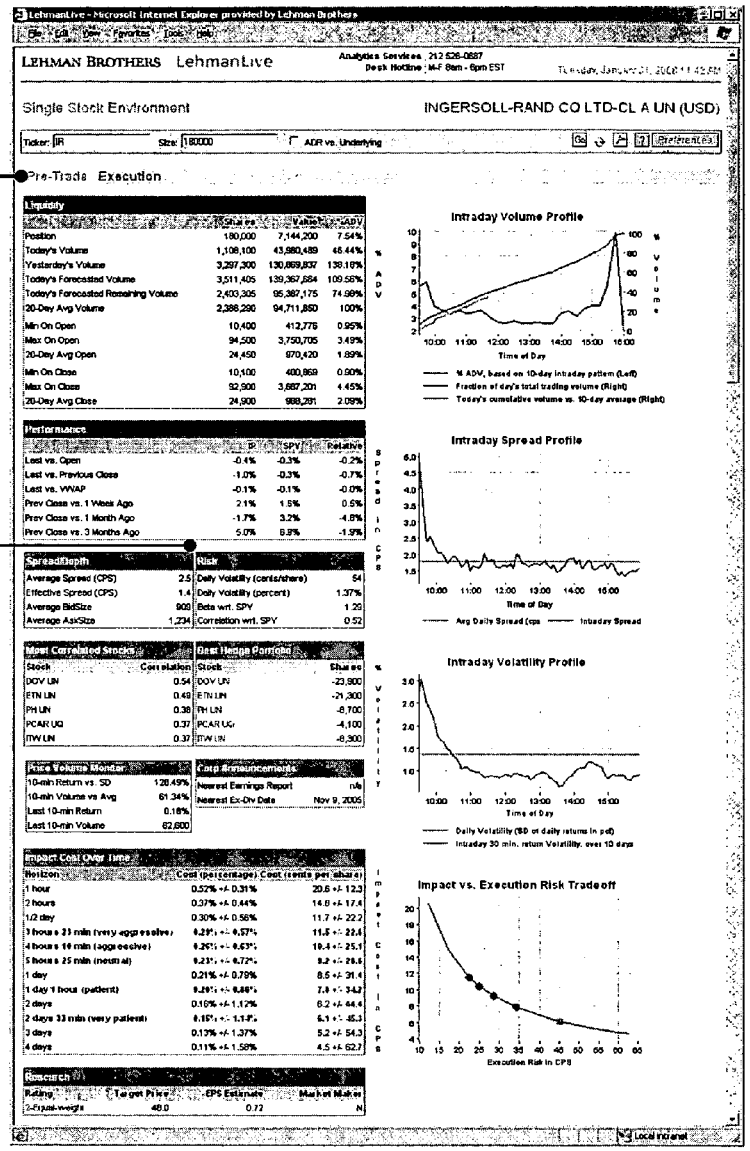
FIG. 1 depicts a preferred pre-trade analysis screen.

I. Representative Workflow:

(1) An OMS user right-clicks an order in OMS blotter and chooses "Load to Analysis and Execution Tool" from a menu of choices (2) A preferred browser screen (see FIG. 1) is automatically spawned with a "Pre-Trade" tab selected, and with the order characteristics (symbol, size, side, and limit price) pre-selected.

(3) The user reviews basic market intelligence on the stock (typical intraday trading patterns for the security, typical liquidity and volatility patterns for the security, correlated securities, etc.).

Figure 2:
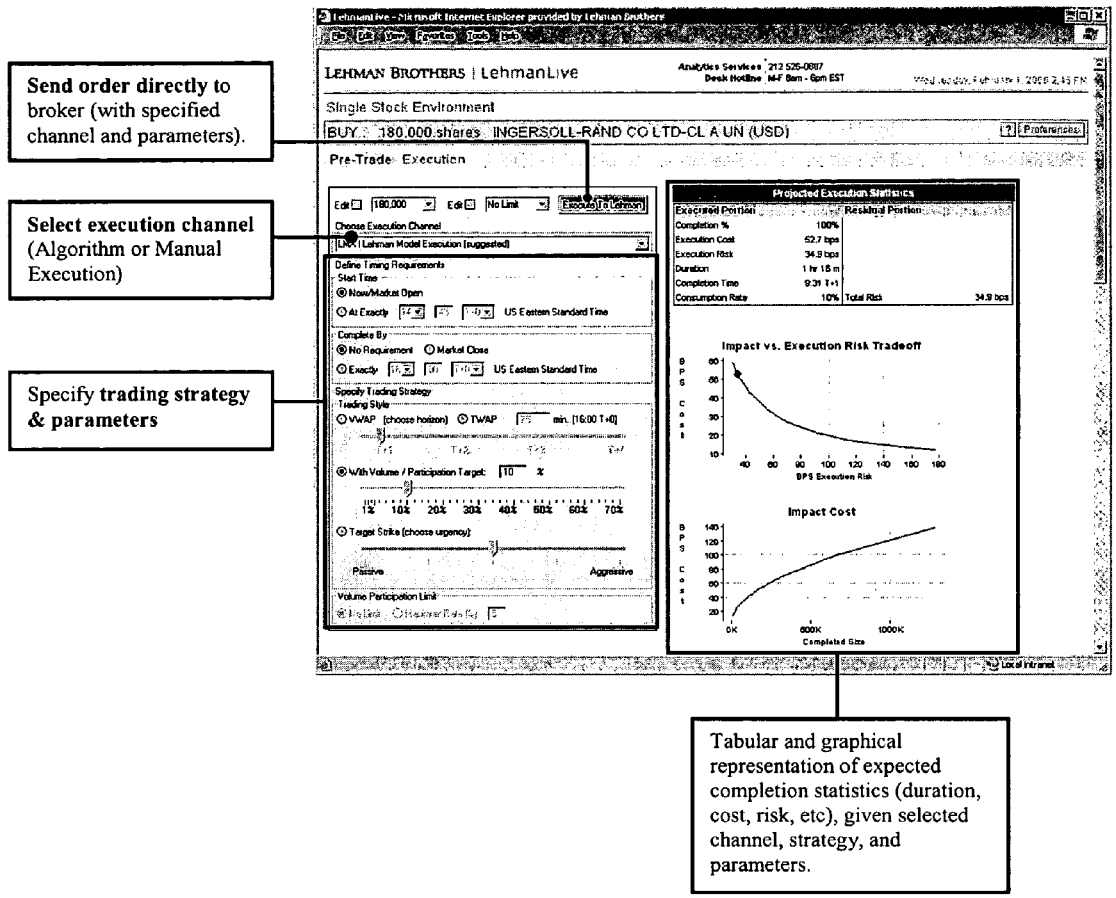
FIG. 2 depicts a preferred strategy selection/execution screen.

(4) The user clicks on an "Execution" tab to switch to a strategy selection and trading screen (see FIG. 2).

Figure 4:
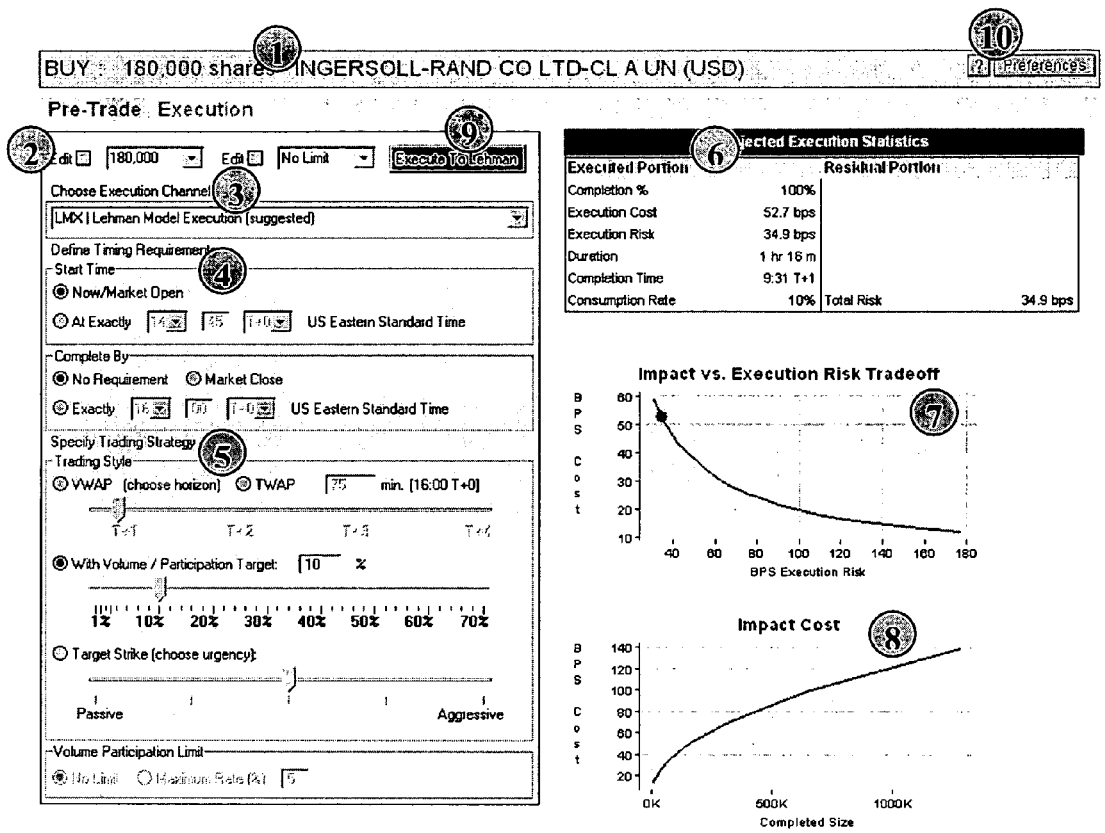
FIG. 4 depicts another view of a preferred strategy selection/execution screen.
Figure 5:
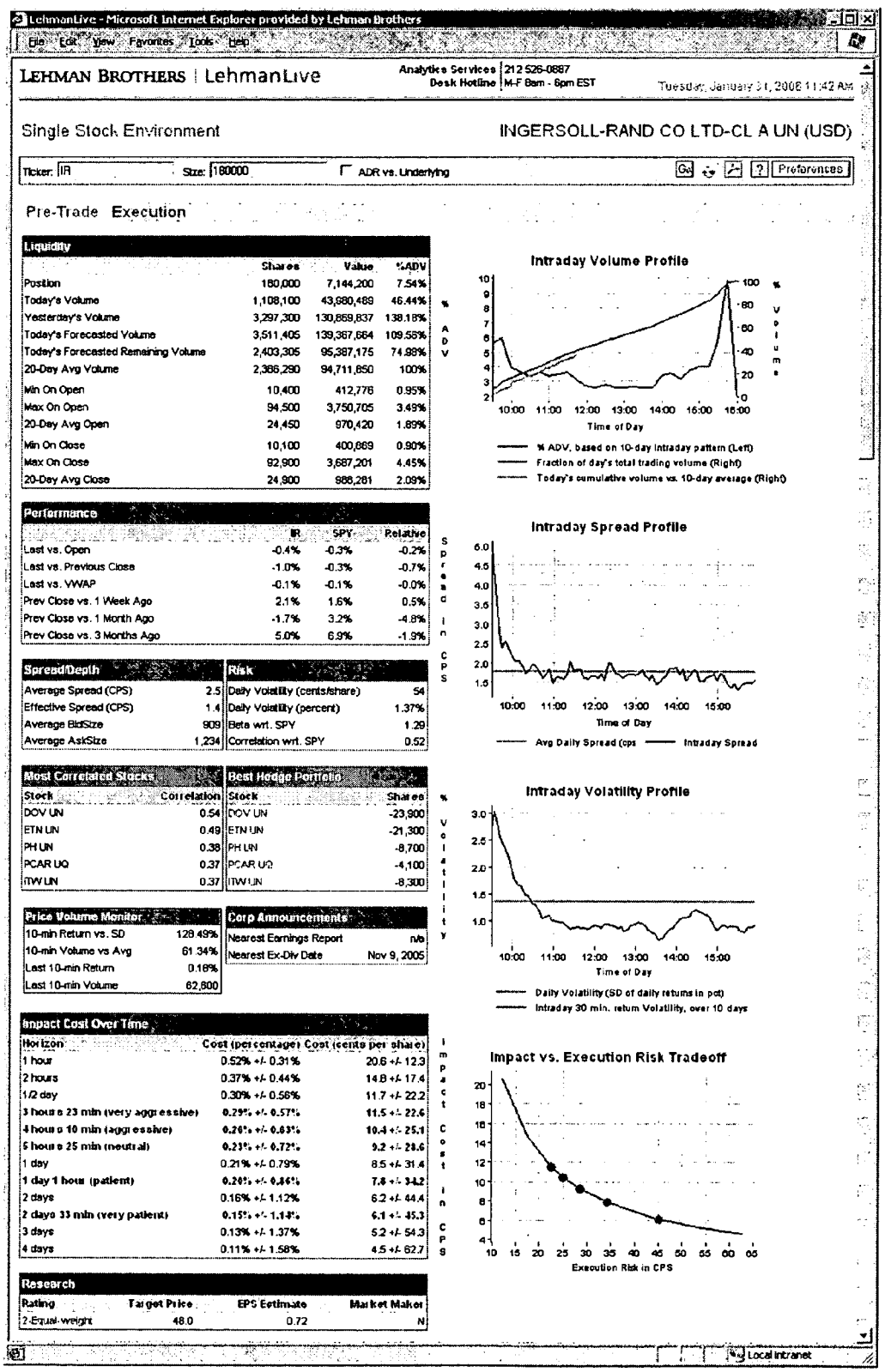
FIGS. 5 and 6 depict additional exemplary Pre-Trade and Execution displays, respectively.
Figure 6:
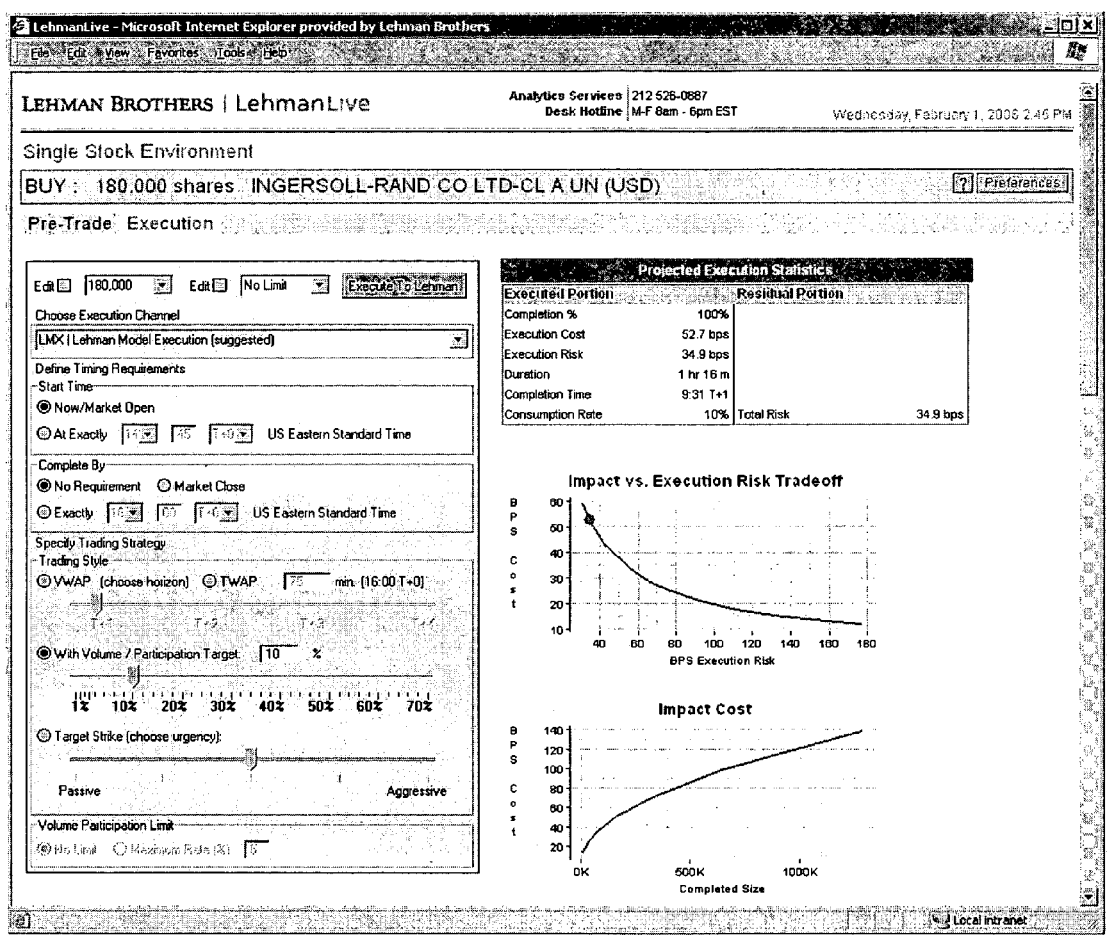

(5) The user chooses an execution channel (e.g., Sales Trader, Direct Market Access, or Execution Algorithm Server) and selects timing requirements (see FIG. 4).

(6) The user uses the strategy parameter controls to preview possible strategies, before settling (in this example) on a VWAP strategy.

(7) The user uses additional strategy parameter controls such as the VWAP horizon slider, and is able to view impact of these parameter choices on expected cost and risk.

(8) Once the user is comfortable with all of the parameter settings, they click an "Execute" button to indicate that they are ready to send the order to the selected execution channel.

(9) A confirmation dialog box (see FIG. 10) appears, reading back the selected channel and strategy to the user, and the user confirms with a mouse-click.

(10) The order is passed back to the OMS and on to an executing broker, with all appropriate parameters specified.

Various embodiments of the invention provide:

(A) A monitoring component with extensive drill-down to interpret execution performance.

(B) An integrated post-trade transaction cost analysis tool.

(C) A plain-English algorithm wizard that provides interactive education on benchmark selection, strategy selection, etc.

(D) Extension of all components to allow baskets of securities (also known as 'lists,' 'programs,' or 'portfolios') to be processed by the same type of method. In this case, the user would select a basket of securities in the OMS blotter, right-click to invoke the method, view analytics and data on the basket (in the aggregate and/or at the constituent level), select a channel and parameter settings, and execute the basket.

II. Detailed Description of Application Components

A. Tab Control

Figure 3:
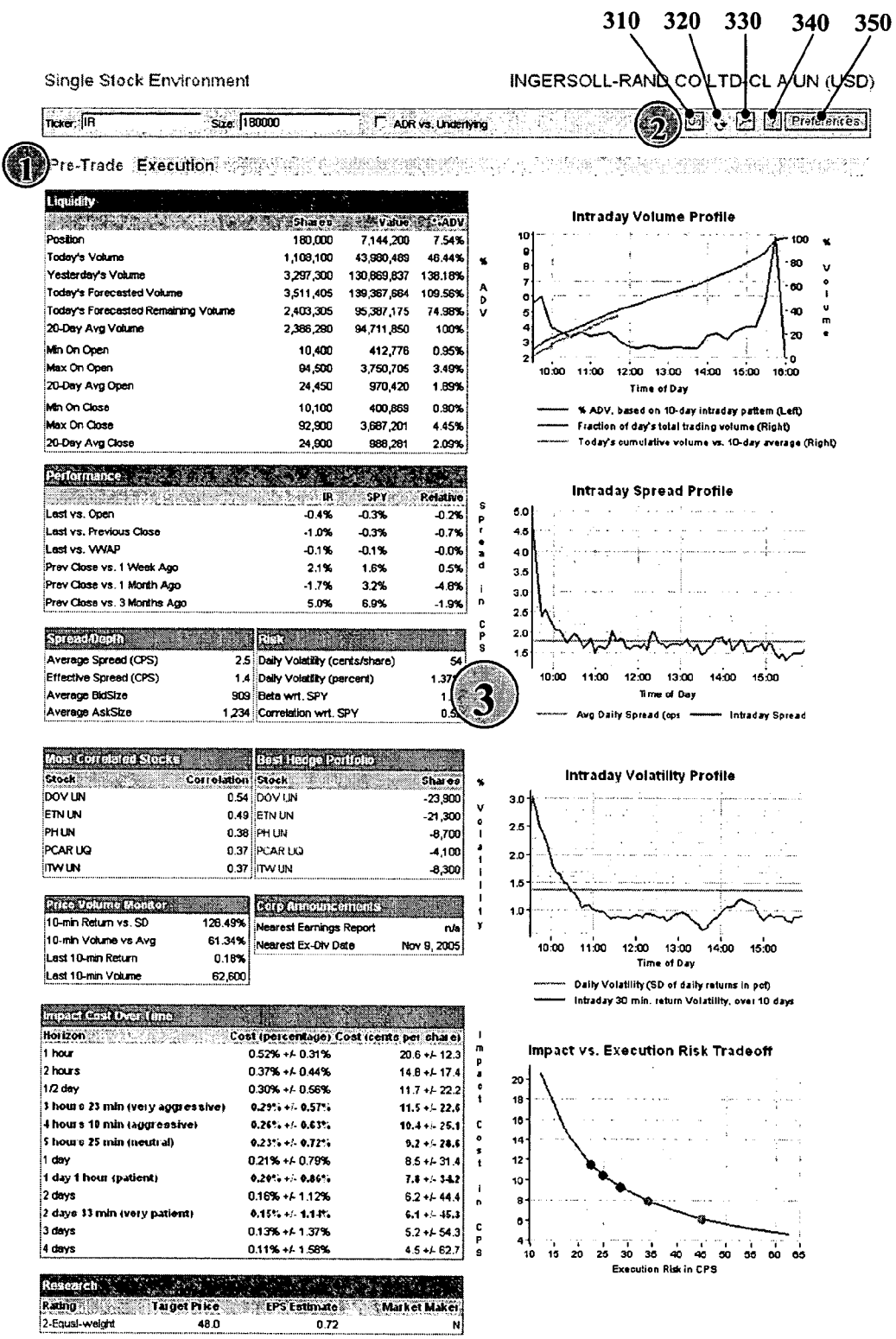
FIG. 3 depicts another view of a preferred pre-trade analysis screen.
Figure 7:
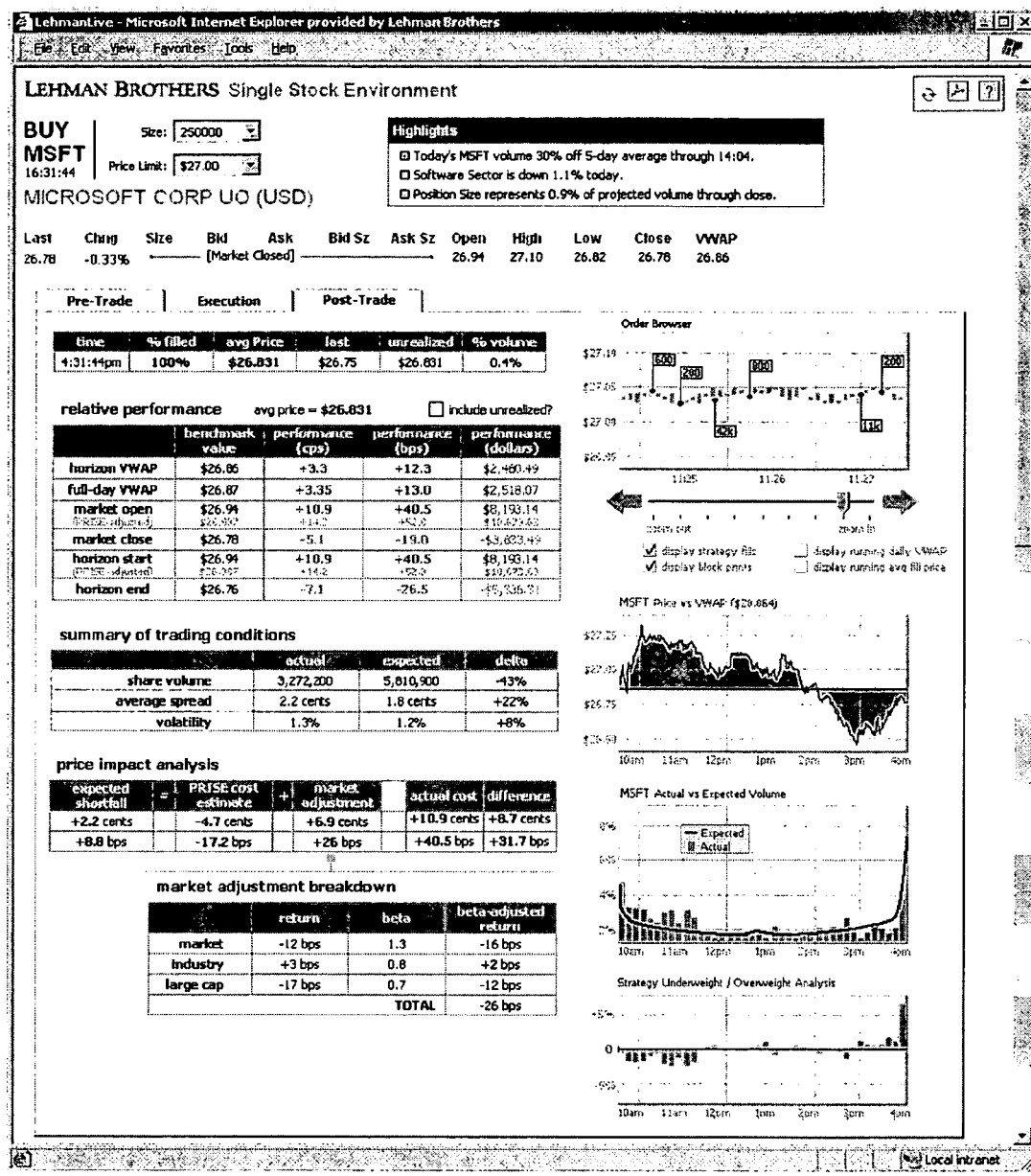
FIG. 7 depicts an exemplary Post-Trade/Order Monitoring display.
Figure 8:
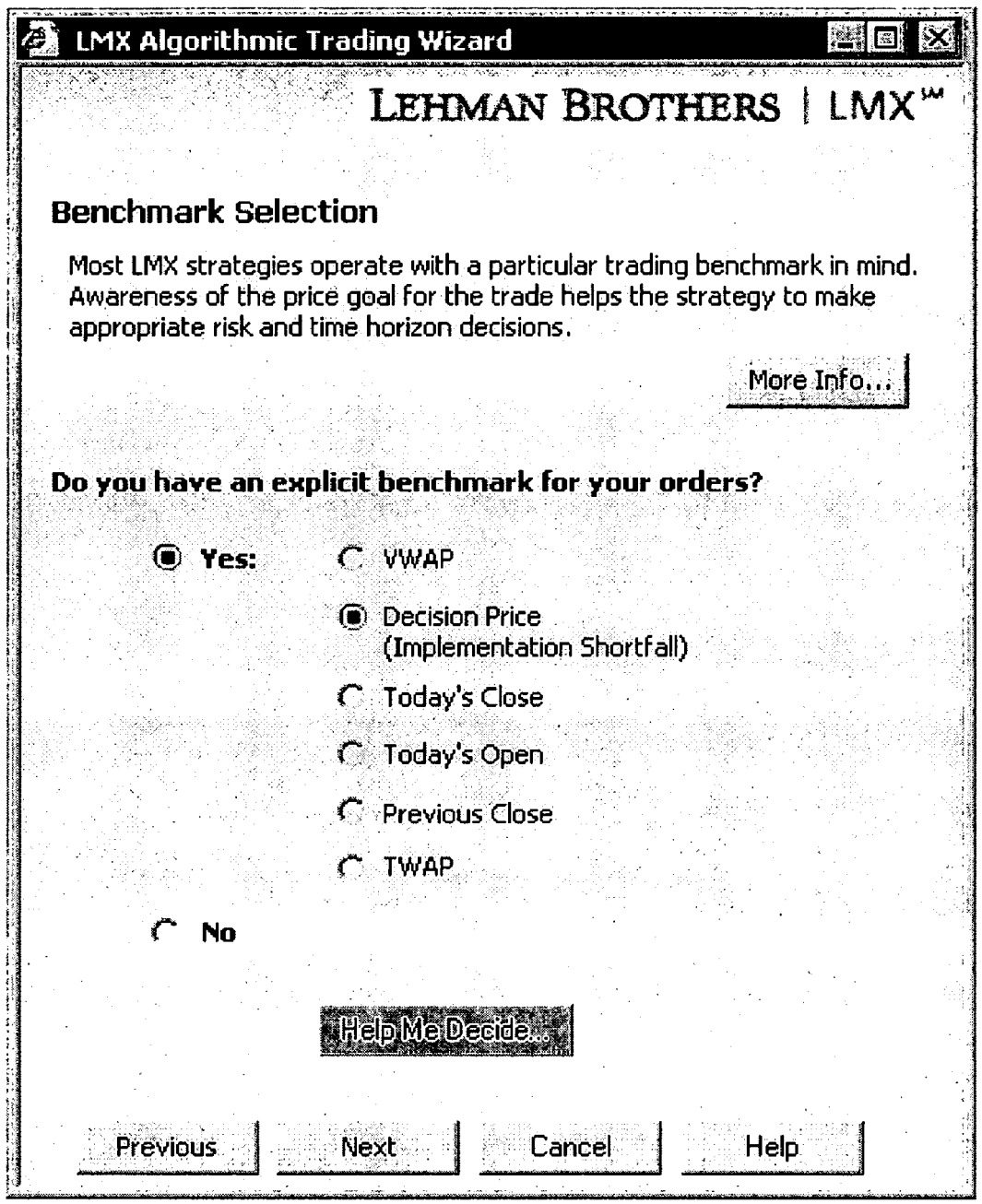
FIG. 8 depicts an exemplary benchmark selection display.

See section 1 of FIG. 3. Preferably, there are two tabs: Pre-Trade and Execution. The default is Pre-Trade. Other embodiments additionally comprise an Order Monitoring/Post-Trade tab. See FIG. 7.

B. Button Bar

See section 2 in FIG. 3. The button bar is displayed under the Pre-Trade tab. It preferably comprises a "go" button 310, a refresh button 320, an "export to pdf" button 330, a help button 340, and a preferences button 350. The "go" and refresh buttons update the page with real-time data, the pdf button generates an Adobe® pdf document containing a rendering of the browser page, the help button links to an online help document, and the preferences button allows users to select default settings for certain calculations (e.g. time frame for calculating average daily volume; requirements for stock universe for determining most correlated stocks/best hedge portfolio).

When the user is in the Execution tab, the page automatically refreshes with any user action, so there is no need for the go and refresh buttons; therefore only the help and preferences buttons are displayed under the Execution tab.

C. Analytic Nuggets

See section 3 of FIG. 3. Analytic nuggets are displayed under the Pre-Trade tab and preferably comprise such displays as historical average volume; today's projected volume; today's projected remaining volume; today's actual volume so far; order size as a percentage of historical average volume; historical intraday volume profile (in 15-minute buckets); descriptive statistics about the historical opening and closing auctions for the stock (N-day minimum, N-day maximum, and N-day average); recent stock performance; historical average quoted spread; historical average bid and ask depth; historical average effective spread; historical intraday spread profile (in 5-minute buckets); daily volatility; historical intraday volatility profile (in 5-minute buckets); beta and correlation with respect to various indices; price change over the last 10 minutes in absolute terms and as a percentage of standard deviation; market volume over the last 10 minutes in absolute terms and as a percentage of historical average 10-minute volume; dates of recent and/or upcoming ex-dividend dates; recent and/or upcoming earnings announcement dates; top 5 most correlated stocks (drawn from some user-defined universe); best hedge portfolio constructed from stocks in some user-defined universe; and projected impact and risk for various time horizons.

These displays are determined using both historical and real-time market data and are updated using real-time market data when either the go or refresh button is clicked. Some displays are based directly on market data, while others require mathematical calculations. Volume forecasts are estimated using a proprietary volume forecasting model. Cost forecasts are estimated using a proprietary transaction cost forecasting model. Volatility and correlation analytics and the top 5 most correlated stocks are estimated using proprietary risk models. The best hedge portfolio is constructed using a proprietary portfolio optimization tool that utilizes the proprietary risk model. These models and optimization techniques are not themselves the subject of the invention, but are drawn on by the invention to produce data and analytics displays.

The following components D through M are displayed under the Execution tab.

D. Basic Order Information

See section 1 in FIG. 4.

Description: Preferably displays the following information: Side (passed from OMS; not editable in some embodiments); Order Size (passed from OMS; editable in some embodiments); and Security Name (passed from OMS; not editable in some embodiments).

E. Order Size and Limit Price Definition

See section 2 in FIG. 4.

Order Size Field: Allows user to optionally edit order size passed from OMS, preferably with validation (must be >0, must be <=order size passed in from OMS); an edit box that allows user to specify an exact order size; and a dropdown menu that allows user to select size from a set of common-sense slice amounts. This field preferably always displays with comma (and accepts input with or without the comma). This also may be implemented with a spinner control, which allows users to increase and decrease the value by clicking up and down arrows on the side of the spinner. When size is modified (and user hits enter), relevant nuggets are updated to reflect the new size setting. Updated components include: Analytics Tab/Position Size as a percentage of historical average volume; Analytics Tab/Best Hedge Portfolio; Analytics Tab/Forecasted Transaction Costs and Risk for various time horizons; Execution Tab/all tables and charts (see below).

Price Limit Field: Allows user to optionally edit the limit price associated with the order. Typically the price limit is set within the OMS blotter and then passed in to the device. Preferably, the Price Limit Field includes validation (must be a number >0, no upper limit); an edit box that allows user to specify an exact price limit; and a dropdown menu including: "no limit"; current bid; current ask; and some common-sense values such as current bid −10 cents (round to nearest nickel); current ask +10 cents (round to nearest nickel). Preferably, the Price Limit box displays with a $ sign (and will accept input with or without the $ sign). "No Limit" is an acceptable value. This also may be implemented with a spinner control.

F. Execution Channel Menu

See section 3 of FIG. 4. Preferred menu options comprise: Algorithm Execution and Manual Execution. When Manual Execution is selected, the order preferably routes to a Lehman Brothers Desk without user-specified strategy parameter settings. The default value for the execution channel can be fixed based on client preferences or could be chosen through a channel recommendation algorithm that suggests a channel based on order and security characteristics such as order size, average daily volume, volatility, market, and average spread.

For example, a simple recommendation algorithm might route any orders that meet any of the following criteria to the Manual Execution channel and submit everything else to the Algorithm Execution channel:

1. Order Size>25% ADV
2. Order Size>40% of today's forecasted remaining volume
3. Forecasted transaction cost of executing the order from now until end of day is greater than 50 basis points (0.5% of the current stock price)

G. Time Requirements

See section 4 of FIG. 4.

Start Time Control

Description: Allows the user to indicate a specific start time for the order, if desired. Choices preferably comprise: Now/Market Open and a specified time (Exactly).

Radio Buttons: Preferably, one of the two choices is selected at all times. Default=Now/Market Open.

Time Edit Boxes: Default displays current time (grayed out unless the "At Exactly" button is selected). If current time<market open or current time>market close time, the display defaults to market open time instead of current time.

T+n Box: Links the start time choice to a specific date. If time now<market close time then choices are T+0 (default) and T+1. If time now>market close time then box gets set to T+1 and is not editable by the user.

Edit Box Validation: Minutes must be legal (from 0-59); hour cannot be earlier than the hour component of the market open; hour cannot be later than the hour component of market close time. [US: 9:00-16:59 times are allowed.]

Complete By Control

Description: Allows the user to indicate a "drop-dead" time when orders must be filled or else returned back to user. Choices preferably comprise: No Requirement; Market Close; and a specified time (Exactly).

Radio Buttons: Preferably, one of the three choices is selected at all times. Default=No Requirement.

Time Edit Boxes: Default displays market close time (grayed out unless the "Exactly" button is selected).

T+n Box: Links the complete by time choice to a specific date. If time now<market close time, then choices preferably are T+0 (default), T+1, T+2, and T+3. If time now>market close time, then choices preferably are T+1 (default), T+2, T+3, and T+4.

Edit Box Validation: Minutes must be legal (from 0-59); hour cannot be earlier than the hour component of the market open time; hour cannot be later than the hour component of market close time. [US: 9:00-16:59 times are allowed.]

H. Strategy Definition

See section 5 of FIG. 4.

Trading Strategy Selector

Description: Allows a user to select a trading strategy. Choices preferably comprise: VWAP; TWAP; With Volume; and Target Strike. Each of these strategies is described briefly later in this document.

Radio Buttons: Preferably, exactly one strategy choice is selected at all times.

The default strategy can be fixed based on client preferences or could be chosen through a strategy recommendation algorithm that suggests a strategy based on order and security characteristics such as order size, average daily volume, volatility, market, and average spread.

The following controls preferably comprise strategy parameter settings: Horizon Slider, Participation Rate Slider, Urgency Slider, and Volume Participation Limit Control. The default settings can be fixed based on client preferences or could be chosen through a settings recommendation algorithm that suggests settings based on order and security characteristics such as order size, average daily volume, volatility, market, and average spread.

Horizon Slider

Description: Only applies to VWAP and TWAP strategies. Allows a user to experiment with different trading horizons (durations). Horizons preferably extend until end of T+3 (if time now<market close time) or T+4 (otherwise). This allows the user to analyze multi-day trades or perform after-hours cost analysis.

Scope: inactive (and grayed) unless the VWAP or TWAP strategy radio button is selected.

Control Requirements: Allows smooth "browsing" of many setting options (minutes).

Minimum Value: 5 minutes

Maximum Value: number of minutes remaining until market close+number of minutes in three trading days (four if current time>market close).

Horizon Display: as the user drags the slider, the selected number of minutes is continuously displayed. Formats preferably look like this: "328 min [16:00 T+0]"; "10 min [10:32 T+0]"; and "453 min [11:30 T+1]."

Participation Target Slider

Description: Only applies to the With Volume strategy; allows a user to experiment with different volume participation target rates. This target rate represents the user's desired participation rate as a percentage of overall volume. For example, if the desired target is 10%, then the strategy will begin trading at the Start Time and will thereafter endeavor to trade the order such that the shares filled for the order represent 10% of all volume executed on the market since the Start Time.

Scope: inactive (and grayed) unless the With Volume strategy radio button is selected.

Control Requirements: must allow smooth "browsing" of many Participation Target options (percentages).

Minimum Value: 0.25%

Maximum Value: 70%

Scale: 0.25%, 0.5%, 0.75%, 1%, 2%, integers up to 70. No need for fine scale except values below 1 (e.g., 22.25%. is unnecessary).

Edit box: serves two purposes. The user can type in a target participation rate directly (preferably from 0.25% to 70%), which is then automatically reflected by repositioning the slider. The edit box preferably also provides real-time feedback regarding the current slider position.

Urgency Slider

Description: Only applies to the Target Strike strategy; allows a user to experiment with different urgency levels.

Scope: inactive (and grayed) unless the Target Strike strategy radio button is selected.

Scale: Preferably five values, ranging from passive to aggressive.

Volume Participation Limit Control

Description: Allows a user to place a participation ceiling on the order. This ceiling defines the user's maximum participation rate as a percentage of overall volume traded. For example, if the Volume Participation Limit is set at 10%, then the strategy will begin trading at the Start Time and will thereafter endeavor to constrain trading so as to prevent the shares filled for the order from exceeding 10% of all volume executed on the market since the Start Time.

Enabled/Disabled: Full nugget is grayed out when the With Volume strategy is selected, and is active when any other strategy is selected. Also, the edit box should be grayed out whenever "No Limit" is checked, and enabled whenever "Maximum Rate" is checked.

Radio Buttons: No Limit (default) or Maximum Rate. Preferably, one of these two buttons is specified at all times.

Maximum Rate Field: edit box. Valid percentages are 1% to 99% (integer points only). The "%" sign is displayed in the label of the edit box, so users can type in just the integer value.

I. Projected Execution Statistics Table

See section 6 of FIG. 4.

Description: Projected Execution Statistics table shows projected completion statistics based on order attributes, channel, and strategy parameters. As the user adjusts the strategy parameter settings, the table dynamically updates using to reflect the user's current selections. The projected completion statistics may be supplied by transaction cost and risk models known in the art.

Statistics displayed for the executed (completed) portion of the order preferably comprise:

Completion %: Projected % of order that will be executed by the specified Complete By time.

Execution Cost: Projected impact cost in basis points.

Execution Risk: Projected execution risk (standard deviation of cost) in basis points.

Duration: Projected trade horizon.

Completion Time: Projected trade horizon end time.

Consumption Rate: Projected participation rate as a percentage of overall market activity during trade horizon.

For certain orders, the model forecasts that the order will not finish by the time specified under the Complete By control component. In this case, the right side of the table displays statistics on the residual (unfinished) portion of the order. These residual statistics preferably comprise:

Residual %: Projected residual position (% of order) at the specified Complete By time.

Residual Cost: Projected cost of liquidating residual position over a one-day time horizon.

Residual Risk: Projected price risk of residual position (including the risk incurred during both the one-day liquidation horizon and the original duration).

Total Risk: Projected total cost of executing the entire order (including both completed and residual portions).

J. Impact vs. Execution Risk Tradeoff Chart

See section 7 of FIG. 4.

Description: Chart shows expected impact cost and execution risk tradeoff for various execution horizons. The line is formed by graphing the expected cost and risk (as provided by the proprietary transaction cost forecasting model) of executing the full order size (as defined by the Order Size field) over various time horizons from 0 minutes out to 8 days. A point on the chart indicates the expected cost and risk of the order given current channel and strategy settings, corresponding exactly with the Projected Execution Statistics table. Additional functionality can be added in the form of marks on the graph representing values from different combinations of strategy parameters that have been previewed.

K. Impact Cost Chart

See section 8 of FIG. 4.

Description: Chart shows expected impact cost in basis points for various executed quantities over the projected execution duration given current channel and strategy settings. For example, if the Duration field in the Projected Execution Statistics Table were currently reading 3 hours, then the Impact Cost Chart would show the projected execution cost (from the proprietary transaction cost forecasting model) for each various order sizes ranging from much smaller than the order size to much larger than the order size.

L. Execute Button

See section 9 of FIG. 4.

Execute Button: Preferably generates an order back to OMS with desired channel, strategy, and parameters filled into the appropriate FIX fields, and generates a pop-up confirmation window (see FIG. 10) that reads the current channel and strategy choices back to the user and gets their consent.

Once the user confirms the order, the order is communicated electronically to Lehman Brothers with all channel, strategy, and parameter settings intact. This allows the user to immediately execute the selected strategy, which is preferable in that it saves time and mouseclicks, and thus streamlines the user's workflow.

M. Help and Preferences Buttons

See section 10 of FIG. 4.

Help Button: Links to an online help document.

Preferences Button: Allows users to select default settings for certain calculations (e.g. time frame for calculating average daily volume; requirements for stock universe for determining most correlated stocks/best hedge portfolio).

Monitoring Tab

As mentioned above, another embodiment also provides a post-trade/order monitoring display. See FIG. 7.

Real-time monitoring allows a user to track progress and performance in real time. A preferred Post-trade analysis display preferably shows T+0 and T+1 performance analysis versus all major benchmarks. Visualization tools comprise graphical tools that allow a user to browse an order in the context of other market activity. Preferred displays comprise Relative Performance; Price Impact Analysis; and Market Adjustment Breakdown.

Adding monitoring capabilities into an embodiment of the Single Stock Environment (SSE) (discussed above) may involve three components:

(1) "Monitoring" Tab: an extra tab in SSE that contains single-order performance and completion stats with graphical drill-down tools.

(2) "View All Orders" Tab: a lightweight blotter-like screen through which users can view all orders they have sent to Lehman so far today. This screen will provide brief performance and progress status information for all orders, with the ability to drill down into any one order (by pulling up the SSE).

3) Support for Secondary Actions from SSE: extension of the Execution tab and the strategy selection tool to cover cancel and cancel/replace functionality (e.g., how will a mid-stream correction to a more aggressive urgency level affect the expected completion time and performance, given that a portion of the order has already filled.)

In addition to these components, the existing two tabs of SSE preferably are updated to pull the order information and quote line into the tab structure to match the new tabs. This is especially recommended for the "View All Orders" tab.

Monitoring Tab

Figure 11:
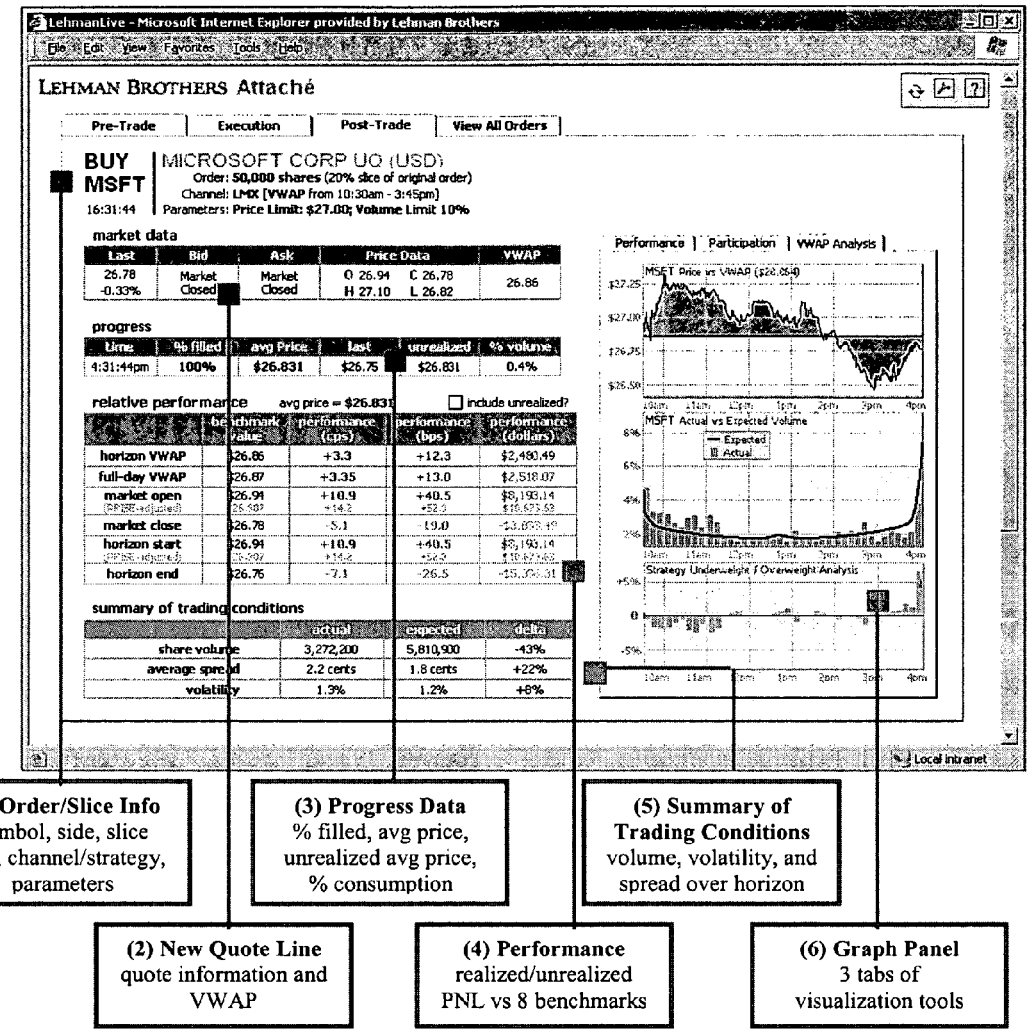
FIG. 11 depicts another view of an exemplary Post-Trade/Order Monitoring display.

The Monitoring Tab preferably is the third tab in one embodiment of the SSE tab structure. Note that when order end time has passed, the name of the tab should switch to "Post-Trade" (as is shown in FIG. 11). FIG. 11 displays the Monitoring Tab, which preferably comprises consists of six components.

The Monitoring Tab operates at the slice order level. If the user has sliced up his order and executed in pieces, then the monitoring tab is used to drill down into each slice. Each slice can have its own size, channel and strategy, parameters, and performance data. Throughout the following Monitoring Tab discussion, any mention of order is intended to refer to the slice order. Similarly, order start time refers to the start time associated with the slice order.

Order/Slice Info (see FIG. 12) preferably displays the following information: (1) Symbol, (2) Side, (3) Current time, (4) Full company name, (5) Order information (6) (size, etc), (7) Channel, and (8) Parameters.

If the slice represents the complete parent order originally loaded into SSE, then there is no need to display "(100% of original order)" in the "Order" line. Also, if the order was not initiated in SSE, then parent order information is likely unavailable and slice % won't be displayed.

For orders sent to the LMX channel, strategy information is distilled into text:

---

VWAP: "VWAP from <start time> - <end time>"
TWAP: "TWAP from <start time> - <end time>"
With Volume: "With Volume: Participate at <participation rate>%"
Target Strike: "Target Strike: <urgency level> urgency"
CAT: "Conditional AutoTrader"

Parameter information preferably includes at least two parameters: price limit and volume limit.

Quote Line may be organized into columns. See FIG. 13. "Last" column contains last price and % change since open. "Bid" and "Ask" contain bid/ask quoted prices and sizes. "Price Data" contains open/high/low/close prices. And "VWAP" contains the running VWAP for the day.

Progress Data (see FIG. 14)

This component preferably displays the following information: (1) Current time, (2) % complete (shares filled for slice/slice target size), (3) Average price for slice, (4) Last price (from quote data), (5) Unrealized avg price=(avg price× filled shares+last price×unfilled shares)/target size, and (6) % Volume=filled shares/total market volume from start time to MIN(end time, current time).

Performance

This component preferably is a grid displaying performance data relative to various benchmarks. (see FIG. 15). Performance is displayed in cents, basis points, and dollars. For benchmark price Y, dollar performance is computed as follows: (Y−avg price)×(side=buy? 1:−1)×filled shares. This can be converted to cents (multiply by 100/filled shares) or basis points (multiply by 10000/[filled shares×avg price]). Benchmark definitions are as follows:

Horizon VWAP=VWAP measured from order start time to MIN(order end time, current time). (=NA if current time<order start time; if end time=market close time.

Full-Day VWAP=VWAP measured from market open time to now. (=NA if market not yet open.

Market Open=today's opening price for the stock. (=NA if market not yet open).

PRISE-Adjusted Market Open=Market Open+PRISE Cost×(side=buy? 1:−1), where PRISE Cost is the PRISE cost estimate for the order (see below).

Market Close=today's official closing price (=NA if current time<market close time, or if closing price has not yet been announced).

Horizon Start=arrival price, the midpoint of the bid-ask spread at order arrival time (=NA if market is not yet open, or if time now<order start time.

PRISE-Adjusted Horizon Start=Horizon Start+PRISE Cost×(side=buy? 1:−1), where PRISE Cost is the PRISE cost estimate for the order (see below).

Horizon End=midpoint of the bid-ask spread at order end time (=NA if time now<order end time; note that for Target Strike and With Volume, order end time is overwritten by the time at which the order is completed).

PRISE estimates are presented in appropriate units (bps, cents, or $) and are calculated by querying Lehman Brothers' proprietary PRISE (Pre-Trade Impact Shortfall Estimation) model and passing in the symbol, size, and time horizon. For the purposes of PRISE, time horizon is a % of the day in "volume time": the percentage of full-day volume that is typically executed over the interval from MAX(order start time, market open) to MIN(order end time, market close). If end time >=market close, the closing auction print is included. For With Volume and Target Strike strategies, the end times used for the PRISE calculations are not the user-specified expiration ("must complete") times; they are the estimated completion times (from the "execution" tab). It is preferable to re-estimate the estimated completion time periodically for With Volume orders.

The Include Unrealized checkbox (unchecked by default) allows the user to estimate unrealized PNL using the same component. If this box is unchecked, everything behaves as shown above, except that unrealized average price [=(avg price×filled shares+last price×unfilled shares)/target size] is computed. This unrealized average price is then displayed at the top of the table (with the label "Unrealized Avg Price") and then all performance data is computed using unrealized avg price in place of avg price. The formulas themselves preferably do not change at all.

Summary of Trading Conditions

This component displays volume, spread, and volatility information for the lifespan of the order (see FIG. 16). Expected values should represent expectations prior to the start of the trade of prevailing conditions over the expected order horizon—expectations that would have been used as inputs into the PRISE model when computing cost and risk estimates. For volatility and spread, these can be lifted directly out of the intraday spread and volatility profiles on the pre-trade (SSA) tab.

Actual volume is the total composite share volume from order start time to MIN(now, order end time, market close time). Actual spread and volatility are averaged values over the same time horizon. The delta column=(actual−expected)/ expected.

If the order is in progress, the expected volume needs to be adjusted so that it's computed over the time interval from order start time until now. For example, an order is placed in VWAP at 10am with a 4pm expiration time. The expected market volume over this 6 hour interval is 10 million shares. If the user checks on the order at 10:05 (after 40,000 shares have printed on the market), the expected volume shouldn't read 10 million, it should be equal to the pre-trade expectation for the interval 10:00-10:05. Note that this is also an issue for spread and volatility, but those are presented as averages (not in cumulative terms like volume).

For trades in Target Strike or With Volume, the time horizon used to create actual and expected volume should be adjusted for cases where the order is completed ahead of the user's specified end time. For example, an order is placed in Target Strike at 10am with a 4pm expiration time. The expected market volume over this 6 hour interval is 10 million shares. If the order completes at 11am, then the time horizon for expected and actual volume should be 10-11am, not 10am-4pm. Again, this is also an issue for spread and volatility, but it's not as important since those are presented as averages (not in cumulative terms like volume).

Even though a volume model may be used to dynamically update volume forecasts based on up-to-the-second market data, the Expected Volume value should preferably be calculated as the expectation of market volume given information as of the start of the trade.

Visualization Panel

Figure 17:
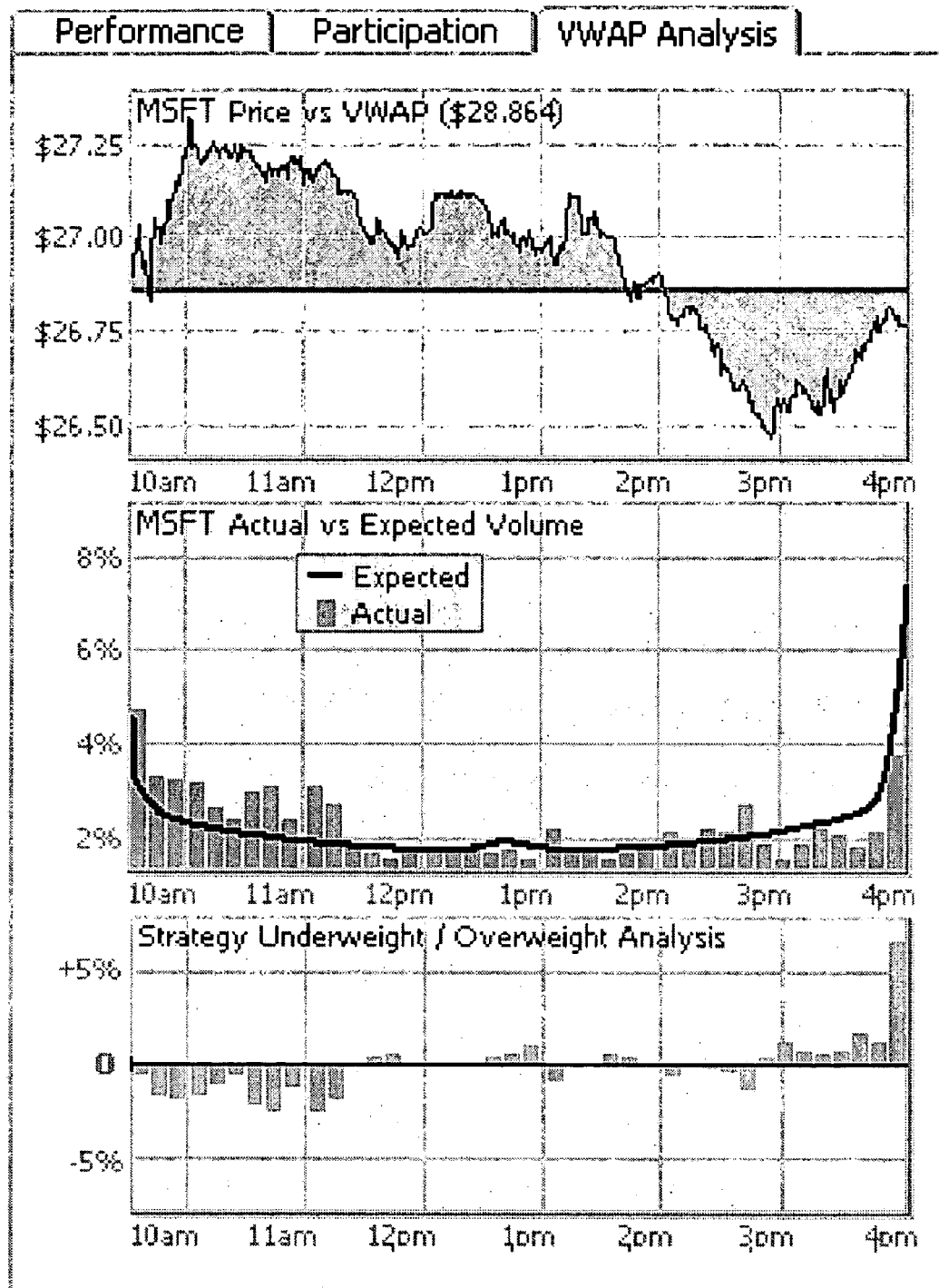
FIG. 17 depicts an exemplary VWAP analysis display.

This panel (see FIG. 17) preferably comprises 3 tabs containing 3 graphs per tab. All graphs share the same X-axis: time.

The time horizon displayed on all nine graphs preferably displays the full order lifespan plus pre- and post-trade periods.

Specifically, graph start time (GST)=MAX(market open time, slice order start time−30 min) and graph end time (GET) =MIN (market close time, slice order end time+30 min). Round both GST and GET to the nearest round 10-minute number. Example: order start and end times are 10:32:01 and 11:03:52, so GST=10:00 and GET=11:30. For Target Strike and With Volume orders that have completed trading, order end time preferably is set equal to the actual completion time; otherwise, the order end time is left as whatever the user entered for expiration time ("must complete" time). If the monitoring tab is viewed during the trade, the x-axis scale preferably is run all the way out to the GET, but the data series is only plotted out to the current time, leaving the unrealized portion of the time horizon blank. If order end time is >=market close time then the time bin that includes the market close time preferably is extended to include any closing auction volume.

Whenever GET−GST>180 min, any bucketed variables (displayed in bars) preferably are displayed in 10-min buckets. Otherwise, 5-min buckets are used.

Visualization Panel: Performance Tab

Graphs #1 and #3 on this tab preferably are driven off a benchmark choice, which is provided via a drop-down menu. All of the benchmark options on the Relative Performance nugget are available: Horizon VWAP, Full-Day VWAP, Market Open (PRISE-adjusted and regular), Market Close, Horizon Start (PRISE-adjusted and regular), and Horizon End. All benchmarks are computed as described in the Relative Performance nugget section above. If the benchmark value is NA, a blank graph is displayed. The default benchmark is Horizon Start.

Graph #1: Performance over Time

Figure 18:
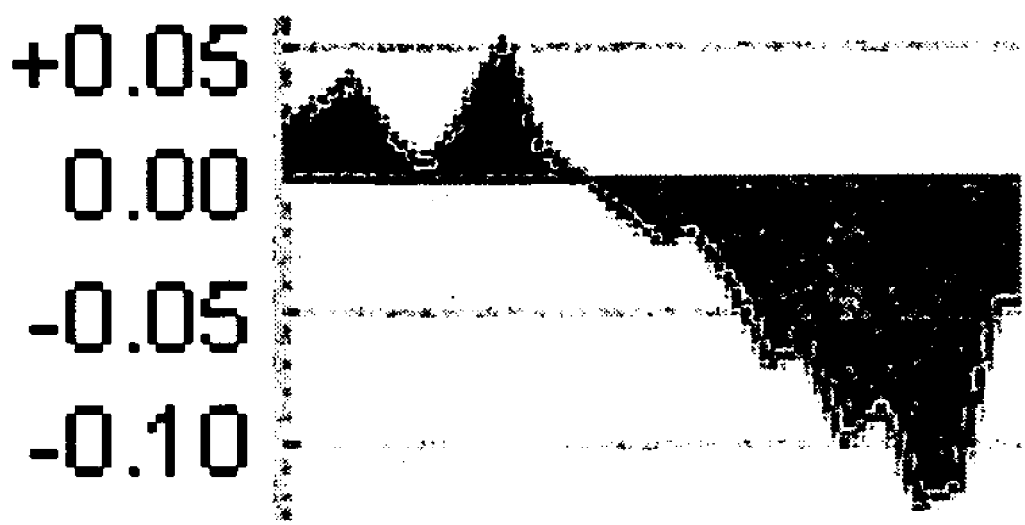
FIG. 18 depicts an exemplary performance over time display.

This graph (see FIG. 18) shows shortfall [(side=buy?−1:1)×(average fill price minus the benchmark price)] over the lifespan of the order. The line should look like a jagged staircase, with each stair representing a recalculation of avg price triggered by a fill. The shortfall series is graphed at a 1-minute granularity. The area between the shortfall line and 0 preferably is colored green if shortfall is positive (beating the benchmark) and red if shortfall is negative. The series should only be plotted in the portion of the graphed time horizon where the order was active. (No pre-start/post-finish.) Note that the two VWAP benchmarks change over time; slippage over time should be relative to the minute-by-minute VWAP value, not relative to the current (or final) VWAP value. Graph title preferably reads "Performance vs <benchmark name> Over Time." Hovering the mouse over a point on the graph displays the time and shortfall value for the time represented by that point.

Graph #2: Relative Performance

Figure 19:
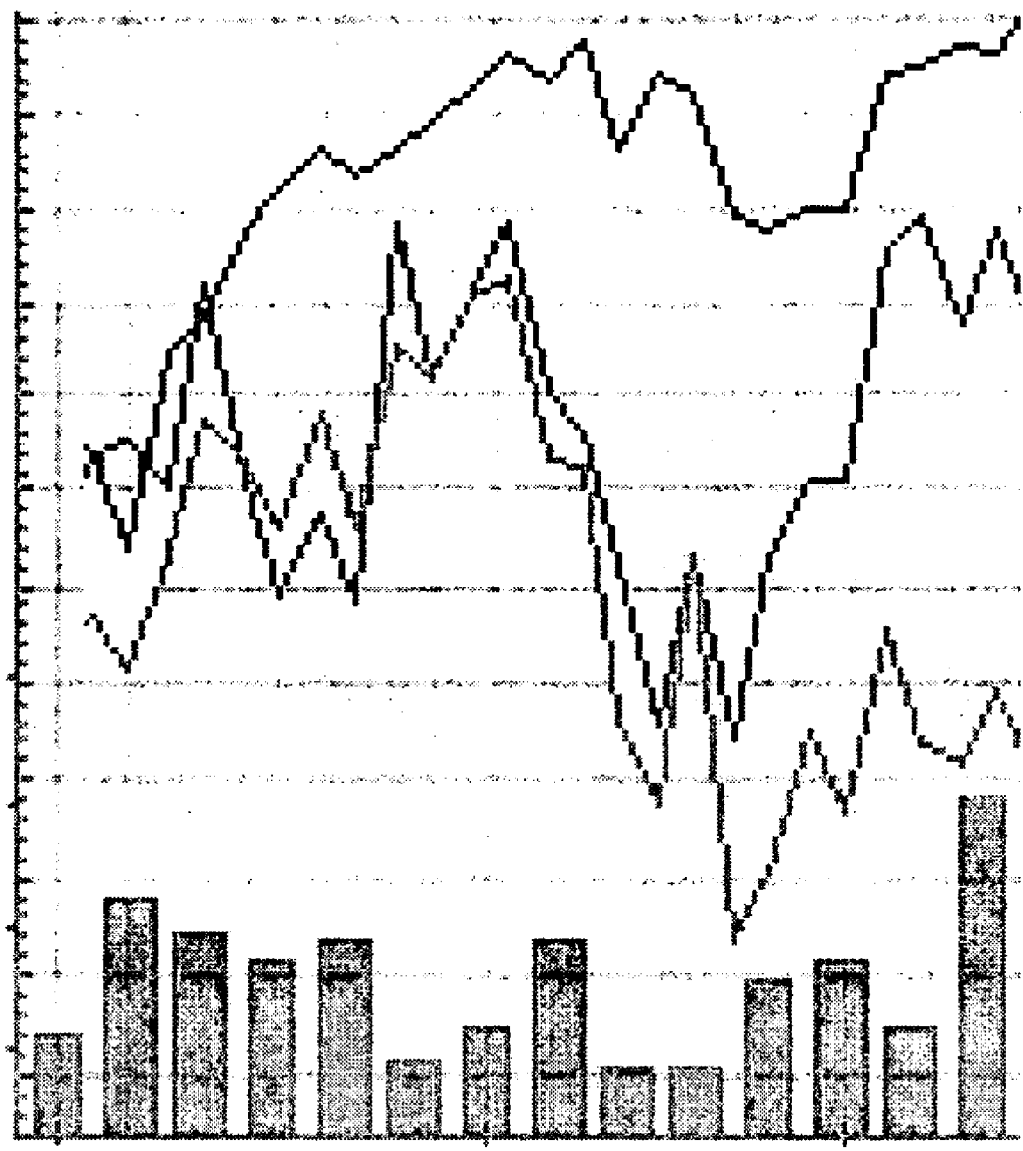
FIG. 19 depicts an exemplary relative performance display.

This chart (see FIG. 19) has two sections. The top displays three series at 1-min granularity: stock price, market index, and industry (sector) index. All three series are normalized by dividing by the value at the start of the trade and are displayed in % (with 100% being the baseline value—preferably indicated with a horizontal line). The bottom section shows the # of shares filled by the strategy across time, bucketed into 5- or 10-min buckets (as previously described). This series will be 0 for the pre-start and post-finish periods in which the order was not working.

The market index selected for the comparison preferably is a broad market index representing the country.

Graph #3: Trade Timing

Figure 20:
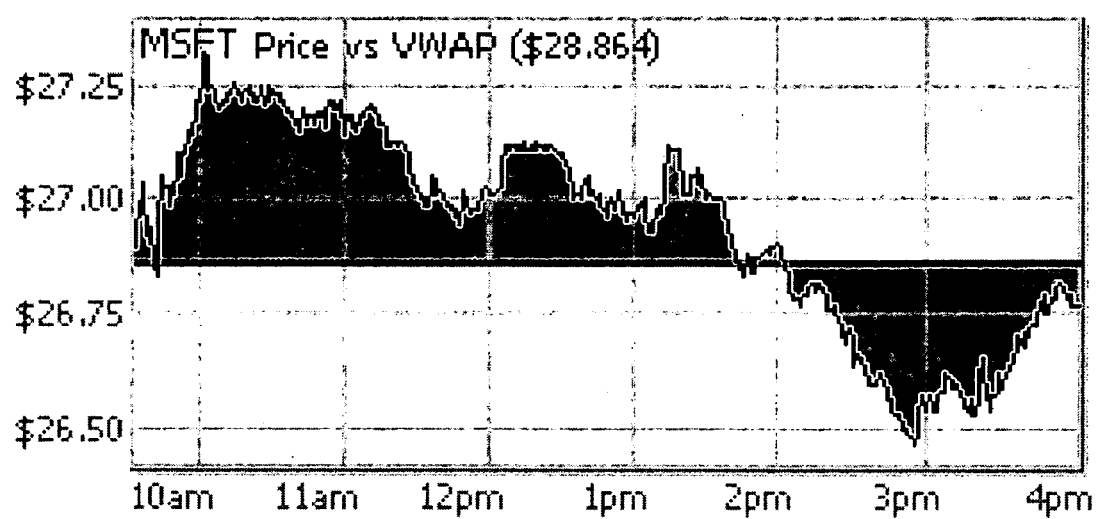
FIG. 20 depicts an exemplary trade timing display.

This graph (see FIG. 20) shows a bold horizontal line representing the benchmark price and a jagged price line that tracks the symbol price across time. The price series is graphed at a 1-minute granularity. In sections where the price line is above the benchmark, the area between price and benchmark preferably is colored green (sell orders) or red (buy orders), and vice versa for sections where price is below benchmark. This graph need not be very tall, and may be compressed vertically. In the case of the two VWAP benchmarks, the bold horizontal line preferably displays the current (or final) VWAP, not the evolving VWAP over time. The title preferably indicates which benchmark is selected and the current benchmark value. A distinction preferably is made between the pre-start and post-end time periods and the period where the order is active. Hovering the mouse over a point on the graph displays the time, the price, and the benchmark value for the time represented by that point.

Visualization Panel: Participation Tab

Graph #1: Stacked Bar

This display (see FIG. 21) shows bars indicating market volume in each bucket (in # shares) with a shaded/colored subsection of each bar to indicate how much of market volume the order accounted for.

Figure 21:
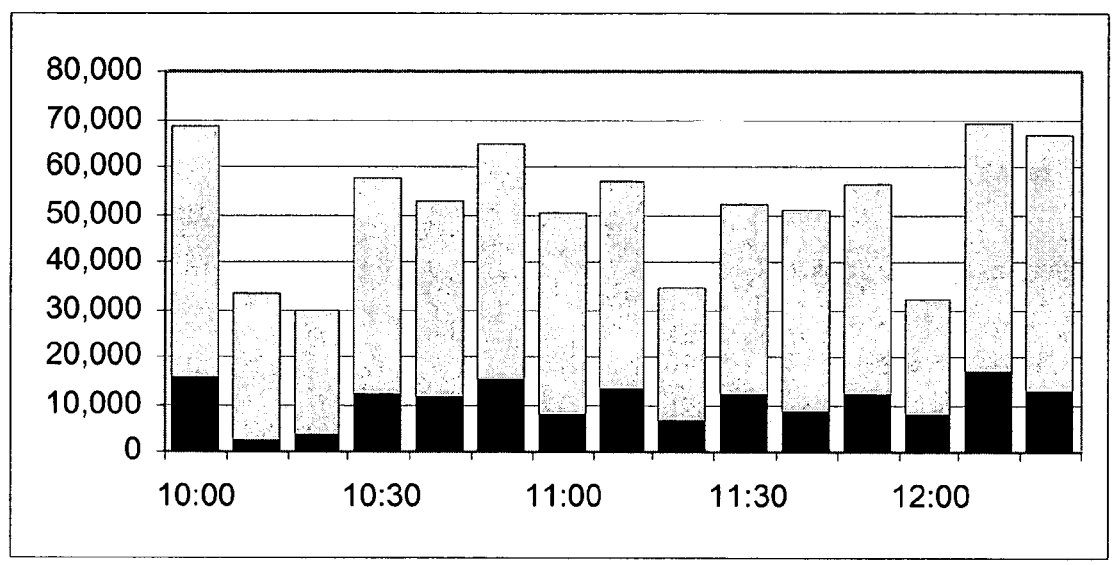
FIG. 21 depicts an exemplary market volume display.

For example, in the first bar in FIG. 21, order fills were 15,000 and overall market volume was 69,000. (Note that pre-start and post-end sections of time also may be displayed; in FIG. 21, these would be all-grey bars.)

Hovering the mouse over a bar on the graph displays the time bucket, the market volume for the bucket, and the quantity filled for the order during the bucket (in shares and % of overall) for the bucket represented by the bar.

Graph #2: Percent Participation

Figure 22:
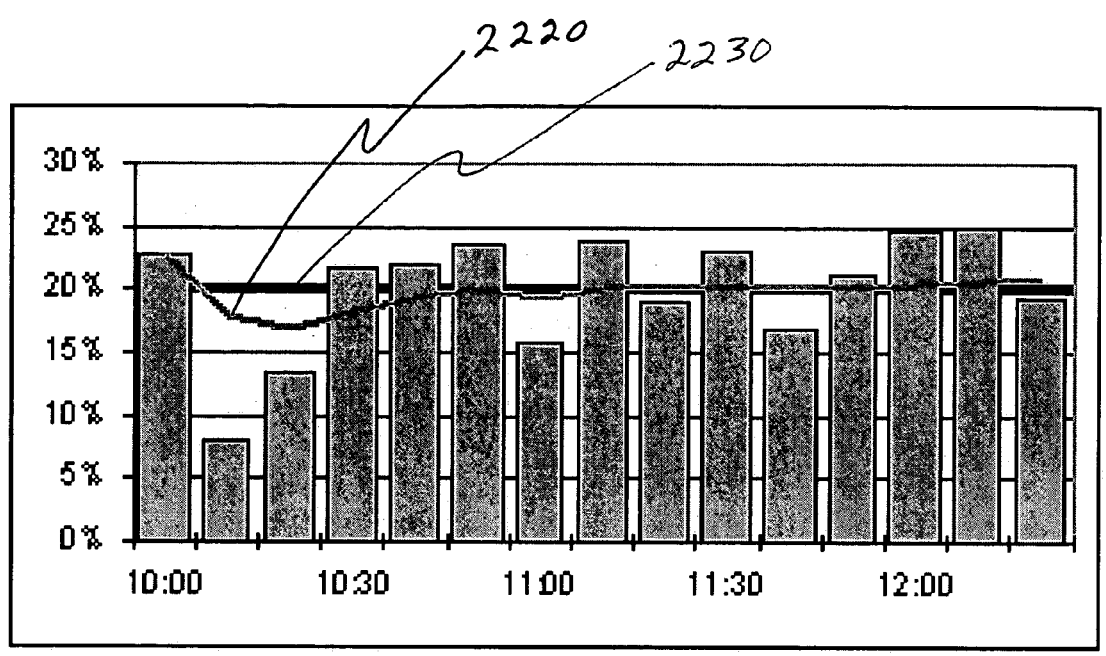
FIG. 22 depicts an exemplary percent participation display.

There are three displays on this graph (see FIG. 22). First, a series of bars showing % participation by time bin is displayed. Each bar shows the number of order shares filled in the bin divided by the total market volume in the bin. These displays preferably are only plotted for the period in which the order was active, not pre-start or post-finish.

The second display (the green line 2220) shows actual cumulative participation rate. For bin i, this cumulative rate is just the sum of order fills in all bins through bin i, divided by the sum of market volume for all bins through i. Preferably, bin length for this series is 1 minute, (to display at 1-minute granularity).

The third display shows the desired participation rate (the solid black line 2230). This is only displayed if the order is an LMX With Volume order. Typically, this is just a solid horizontal line. However, if the user corrects the target participation rate, that is represented with a discontinuous jump to a new plateau. (For non-With-Volume orders corrected to With Volume, there would be a missing section in the line representing the non-With-Volume portion of the time horizon).

Hovering the mouse over a bar on the graph displays the time bucket, percent participation rate during the bucket, and the cumulative percent participation for the bucket represented by the bar.

Graph #3: Participation tracking vs PNL

Figure 23:
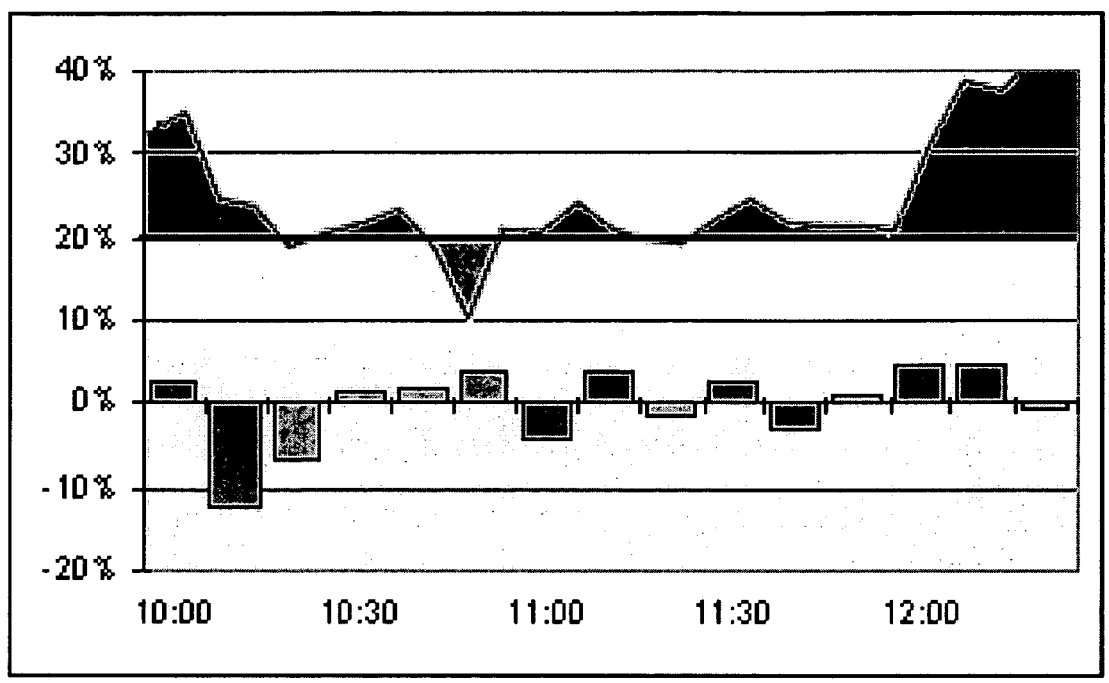
FIG. 23 depicts an exemplary participation tracking display.

There are two displays shown on this tab (see FIG. 23). The top is similar to Graph #3 on the performance tab (see FIG. 20), showing price vs. a bold horizontal line representing the benchmark value. Area between the two lines is colored based on order side (as described in the description of Graph #3 from the performance tab). Benchmark is selected from a drop-down in the performance tab. The second display shows the difference between actual bin participation rate and the target participation rate (as described regarding Graph #2 for this section) (FIG. 22) and is color-coded based on the color scheme of the first display in the graph. See FIG. 21.

If the strategy is not With Volume then there is no target participation rate. In this case, the average participation rate (the right-most value of the green line in Graph #2 above) is used as the target rate.

Hovering the mouse over the graph has different behavior for the top and bottom portions of the graph. Mouse over on the top portion of the graph indicates time, price, benchmark name, and benchmark value. Mouse over on the bottom portion shows the time bin and the relative participation rate (e.g., "+2.3%").

Visualization Panel: VWAP Tab

Graph #1: Price vs VWAP

Figure 24:
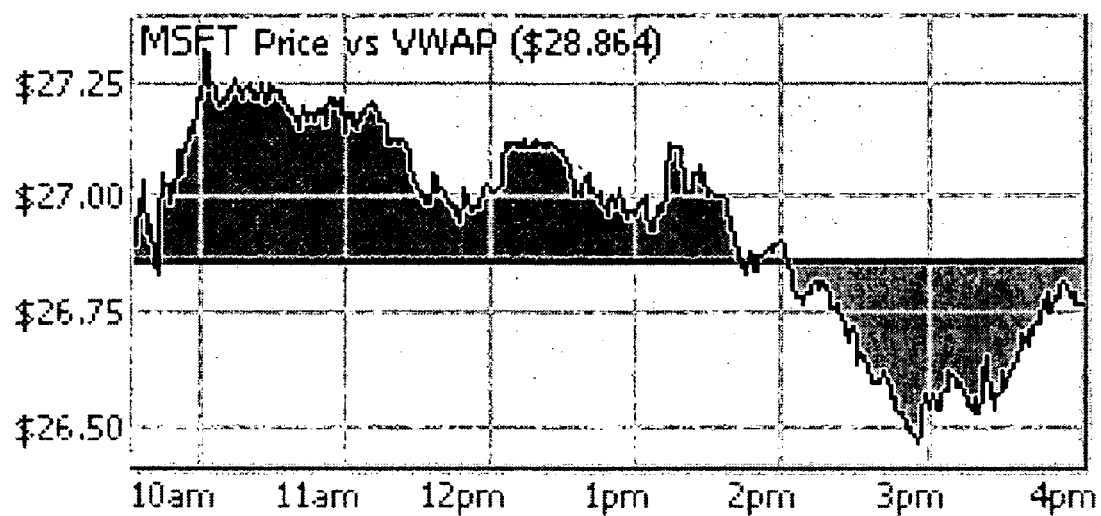
FIG. 24 depicts an exemplary price vs. VWAP display.

This display (see FIG. 24) is similar to Graph #3 on the performance tab, except that the benchmark (indicated by the thick horizontal line) is always the current value of VWAP for the order horizon. The price series is plotted at a 1-min granularity, and the area between the line and the horizontal benchmark line is color-coded as in Graph #3 on the performance tab. Hovering the mouse over a point on the graph displays the time, the price, and the benchmark value for the time represented by that point.

Graph #2: Actual vs Expected Volume

Figure 25:
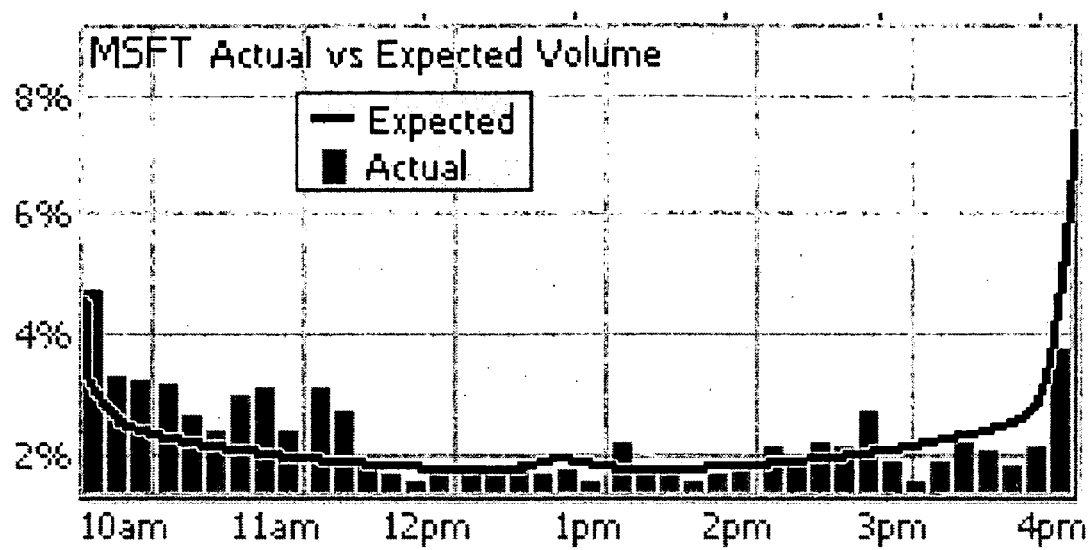
FIG. 25 depicts an exemplary actual vs. expected volume display.

This graph (see FIG. 25) shows the typical (expected) volume smile and the actual volume pattern (in terms of actual fills). The solid line (expected volume) shows the typical volume pattern at a 1-minute granularity. The line is adjusted by multiplying by the number of minutes in each time bin (5 or 10) so that the units are consistent between the two displays. Unlike all other data series in the various graphs, if the graph is displayed mid-trade both the past and future portions of the black line should be plotted. The pre- and post-trade portions of the black line also are displayed, normalized so that these portions are comparable to the active portion of the time horizon. This means that the sum of the plotted expected volume values across the order time horizon (the active portion of the plotted horizon) is 100%×[# minutes in each time bin]. The values in the pre-start portion are normalized so that their sum is in the proper proportion to the sum of the values in the active portion, and likewise for the post-finish portion. If the order end time>=market close, then the 1-minute value for the last minute of market activity includes closing auction volume.

The grey bars show the ratio of market volume printed during bin to total market volume printed within the active portion of the order. If current time<order end time then the second term (total market volume over full order horizon) is forecast. This forecast may be calculated as [market volume printed so far in the active time horizon]+[typical volume from now until end of active horizon]. When the order horizon is complete, the sum of bars for the active portion of the time scale is 100%. If the order horizon is not yet complete, the bars displayed will sum to less than 100%. Grey bars for pre- and post-order periods also should be displayed, using the same normalization process as for the expected smile, normalizing the bars in the pre- and post-order portions so that their sum is in the proper proportion to the sum of the bars in the active portion.

Hovering the mouse over a bin on the graph shows the time bin, the % of the target size filled in the bin, and the average of the values of the 1-min expected volume series during that time bin. Example: "Time=10:20–10:30; Expected Volume Smile=4.5%; Realized Volume Smile=2.6%."

Graph #3: Underweight/Overweight Analysis

Figure 26:
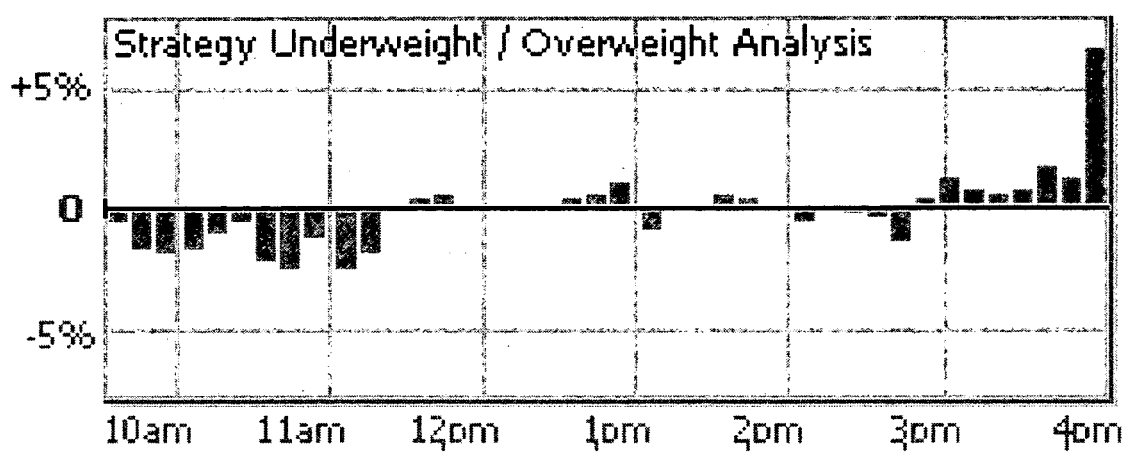
FIG. 26 depicts an exemplary underweight/overweight analysis display.

The bars in this graph (see FIG. 26) display the difference between the two series in Graph #2 above. See FIG. 25. (Since the line in Graph #2 is plotted at 1-min granularity, the plotted 1-min values are averaged across each time bin and then the average value is compared to the bar value. For Graph #3, negative bar values indicate that expected volume smile value (in %) was less than the actual volume smile value, suggesting that a VWAP strategy would have underweighted the bin relative to a hypothetical strategy that could perfectly forecast the volume smile and spread its trades accordingly.

The bars are color-coded as follows: for buy orders, any bars for bins where the bin VWAP<the overall VWAP for the period are coded in green, and bars for bins where VWAP>overall VWAP are coded red. Vice versa for sells.

Hovering the mouse over a bar on the graph shows the time and the under/overweight % for the bar.

Parent Orders vs Slice Orders

The first embodiment described above relates to parent orders. Once the user clicked "Execute to Lehman" the SSE reached the end of its scope. With monitoring, latent orders (not yet sent to Lehman) need to coexist with orders already sent, and a hierarchical data structure is needed within SSE to track parent orders that have been carved up into multiple slices. In order to accommodate this added complexity, it is useful to note an important distinction between parent and slice orders.

Parent orders represent any orders loaded into the SSE. They could be (a) orders loaded from an OMS, (b) orders loaded directly into SSE, or (c) orders sent via any system other than SSE but which are then monitored using SSE. Slice orders ("executed" orders or "allocated" orders) are orders actually sent to Lehman Brothers. For the purposes of SSE, a parent order record is kept for every order loaded into SSE and a slice order record is kept for every order actually sent to Lehman Brothers for execution. Note that the only orders that are known to Lehman's orders databases are the slice executions.

Example 1: User loads 100,000 F into SSE from their OMS. This creates a new parent order record (100,000 F). The user does pre-trade analysis and then executes all 100,000 shares to Lehman's desk using the "Execute to Lehman" button in SSE. As the "real" order is routed to Lehman, a 100,000 slice order record is created within the SSE data structure. So SSE has two order records: a 100,000 parent and a single associated 100,000 slice.

Example 2: User loads 100,000 F into SSE from the user's OMS. This creates a parent order record (100,000 F). The user does pre-trade analysis and then executes a 10,000 share slice. Now a 10,000 slice order record is created and the parent order is updated to reflect that residual size has dropped to 90,000. The user executes a second 10,000 share slice. Now the SSE data structure contains a parent order record with residual size of 80,000 and two associated 10,000 slice order records.

Example 3: User sends 30,000 shares directly to Lehman via an OMS, then later accesses SSE to monitor the order. There is now a 30,000 share parent order record and a 30,000 share associated slice order record.

In the remainder of this description, "parent order" and "slice order" are used to refer to the parent and slice order records within SSE. "Order" does not mean the actual order routed to Lehman Brothers and stored within Lehman's various order databases. The "current order" is the order record (parent or slice) used as a basis for the content on the Pre-Trade, Execution, and Monitoring tabs. In other words, the Execution tab does not exist independently of an order; every time the Execution tab is displayed a specific order record is implicated—the "current order"—to which all data on the tab refers. The current order can be a parent order record or a slice order record.

Both parent and slice orders can be viewed using the four tabs. These are described below individually with nuances for that tab related to the parent/slice distinction.

Pre-Trade Tab

The Pre-Trade tab is basically the same whether the current order is a parent order or an associated slice order. For parent orders, the user is able to choose whether the position size shown (and used for cost calculations, etc.) is the total target size or the residual size.

Execution Tab

When the current order is a parent order, the target size displayed on the Execution tab and used for calculations is the residual size, not the total target size of the parent order. This is to prevent overexecution. When a user clicks "Execute," a slice order is created for the selected slice size, the residual size of the parent order is decremented by the same number of shares, the current order is set to the new slice order, and the user is moved to the Monitoring Tab. For parent orders with zero residual size, the Execution tab is greyed out and inaccessible.

When the current order is a slice order, the Execution tab is primarily used to preview and enact secondary actions (cancel and corrections). This implies a number of changes to the Execution tab for slice orders which are described below.

Monitoring Tab

Figure 27:
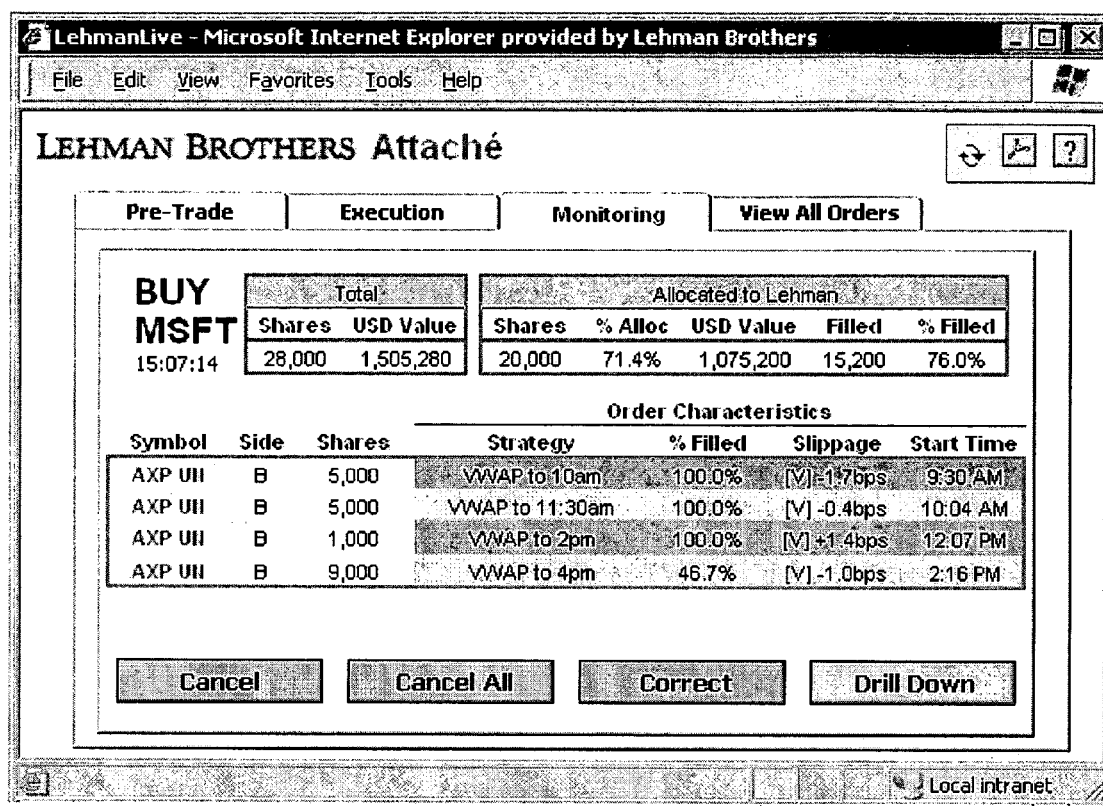
FIG. 27 depicts an exemplary View All Orders tab/display.

The Monitoring Tab is presented differently depending on the characteristics of the current order. For parent orders with no slice orders, the Monitoring tab is greyed out and inaccessible. For parent orders with exactly one slice order, the Monitoring tab display mirrors the Monitoring tab display for the associated slice order. Otherwise (for parent orders with multiple slices), the Monitoring tab contains a list of all of the associated slice orders using the View All Orders tab format (see FIG. 27). The four buttons from the View All Orders tab are here as well. All column definitions, calculations, functionality for buttons, and double-click behavior are the same as described regarding the View All Orders tab (discussed below).

View All Orders Tab

While the information displayed on the other tabs is always linked to a specific parent or slice order, the View All Orders tab is independent of order. In other words, this tab is the same regardless of which order is currently being viewed in SSE.

View All Orders Tab

Figure 28:
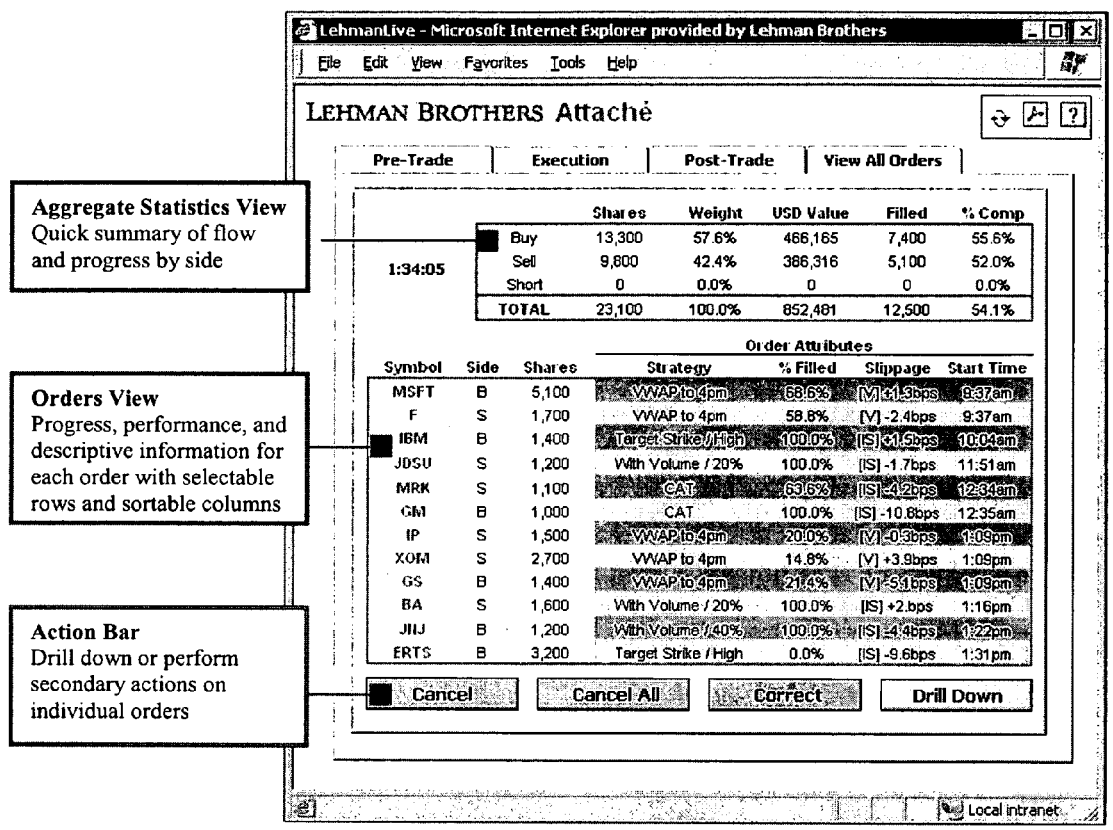
FIG. 28 depicts another exemplary View All Orders tab/display.

The View All Orders tab is a lightweight tool with two purposes: (1) provide a brief spreadsheet-style summary of progress and performance for all orders in the system; and (2) serve as a portal to the SSE, allowing traders to choose an order and then drill down into SSE for more analysis. FIG. 28 shows an illustration of the View All Orders tab.

Aggregate Statistics View

This display presents aggregate data broken down by side (buys, long sells, short sells), as well as a totals row. Data columns preferably include:
  Default Columns
  Shares
  % Weight [=% of total USD Value]
  USD Value
  Filled (shares)
  % Filled [=USD Value Filled/USD Value]
  Additional Columns (optional, default=hidden)
  Orders
  USD Filled
  Unfilled (shares)
  Average Slippage in cents, $, or bps vs various benchmarks:
    Horizon VWAP
    All-Day VWAP
    Horizon Start Price [midpoint at time when order commenced trading]
    Prev Close
    Today's Close [=NA if market still open]
  Avg % ADV
  Orders View This display presents data broken out by each slice order. (Multiple rows with the same ticker are possible.) Rows preferably can be selected using the standard MS Windows protocol (click on one row; click+drag or click+shift/click to select multiple consecutive rows; ctrl/click to add row to selection). Double-clicking a row brings up the Monitoring Tab and sets the current order to the slice represented by the selected row.

Rows may be color-coded so that orders actively working are coded differently from orders that have completed. This may be configurable from the preferences screen.
  Data columns include the following:
  Default Columns
  Symbol
  Side
  Shares
  Strategy [see below]
  % Filled [=Shares Filled/Total Shares]
  Slippage [see below]
  Start Time The "Strategy" column provides a quick text representation of the strategy used to trade the order, as follows:
  DMA Orders: "DMA"
  Desk Orders: "Manual"
  LMX Orders:
    VWAP: "VWAP to <end time>"
    TWAP: "TWAP to <end time>"
    With Volume: "With Volume/<participation rate>%"
    Target Strike: "Target Strike/<urgency level>"
    CAT: "Conditional AutoTrader"

The "Slippage" column provides a view into benchmark slippage. Users are able to use a preferences screen to choose a benchmark for each strategy and the units (BPS, cents, $). By default, units are set to bps, a VWAP benchmark is used for VWAP and TWAP strategies, and a horizon start price benchmark (see the relative performance section above) is used for other strategies. The benchmark is named in the column ("[V]" for horizon VWAP, "[VF]" for full-day VWAP, "[IS]" for horizon start, "[O]" for open, and "[C]" for today's close).
  Additional Columns (optional, default=hidden)
  Wave ID [to help identify slice]
  Filled (shares)
  USD Value
  USD Filled
  Unfilled (shares)
  Currency
  FX
  % ADV
  Avg Price
  Slippage in cents, $, or bps vs various benchmarks:
    Horizon VWAP
    All-Day VWAP
    Horizon Start Price [midpoint at time when order commenced trading]
    Prev Close
    Today's Close [=NA if market still open]
  1-Day Change ($ change in stock price vs previous close)
  1-Day % Change (1-Day Change in %)
  Mkt Volume (today's volume)
  Status (ACK, Working, Filled, CXLed, others?)
  % Cons (Filled/market volume during order lifespan)
  Exp Complete [expected completion time, see Execution tab]
  Average Daily Volume (ADV)
  Average Spread
  60-day Daily Volatility
  Action Bar The action bar preferably comprises the following buttons:
  Cancel: cancel order(s) associated with any selected row(s). Button only available if at least one row is selected in Orders View.
  Cancel All: cancel all orders in Orders View.
  Correct: switch to Execution Tab and set current order to the selected slice order. Button only available if exactly one row is selected—not 0, not >1.

Drill Down: switch to Monitoring Tab and set current order to the selected slice order. Button only available if exactly one row is selected—not 0, not >1.

Viewing 'Parent' Orders

Matters get more complicated when either or both of the following situations occurs:
- A user has loaded an order into SSE from an OMS (or directly) and then executed a slice from SSE that represents only a portion of the order.
- A user accesses the View All Orders tab at a time when there is at least one order that has been loaded but has not yet been sent to Lehman.

When either scenario occurs, the View All Orders tab needs to do double duty, serving as a blotter for all executed slice orders while also allowing the user to view all of the parent orders that have been loaded. Say, for example, that the user has executed portions of three parent orders. The user may wish to monitor or correct working slice orders (from the slice order blotter) or to return to a parent order to generate a new slice (using the parent orders blotter). To accommodate this, when either of the above scenarios occurs, the View All Orders tab changes slightly (see FIG. 29). The top section (aggregate data) expands to distinguish between parent orders (i.e., orders loaded from the OMS) and slice orders (i.e., orders actually executed to Lehman). A radio button control 3010 allows users to switch between two detailed order views (one for parent orders, one for executed orders). The executed orders detailed view is the same as the regular Orders view described above. The parent orders view adds some additional columns. All of these changes are explained in detail below.

If a user only uses SSE to monitor orders that have been executed using another channel, or if the user loads orders into SSE and immediately executes the full target size, then there is no need to provide a view of parent orders, so the View All Orders tab appears as described above.

Viewing "Parent" Orders—Changes to Aggregate Statistics View

As shown in FIG. 28, the display is divided into two sections: "Total" (all orders loaded into SSE) and "Allocated to Lehman Brothers" (just what's actually been executed). As discussed above, the columns displayed are configurable through a preferences screen. Available columns are described below.

"Total" Section Columns

[Column values pertain to parent orders loaded in from OMS]

Default Columns:
[number of orders]
Shares
USD Value
% Weight
Additional Columns:
% Filled [% of total shares filled]
% USD Filled [% of total USD filled]
Unallocated [shares] "Executed" Section Columns
[Column values pertain to only orders "allocated" (sent to Lehman)]
Default Columns:
Shares [allocated]
% Alloc [shares allocated/total shares]
USD Value [allocated]
Filled (shares)
% Filled [filled shares/allocated shares]
Additional Columns:
% Weight [USD allocated by side/total USD allocated]
Orders [Allocated]
USD Filled
Unfilled (shares)
Average Slippage in cents, $, or bps vs various benchmarks:
  Horizon VWAP
  All-Day VWAP
  Horizon Start Price [midpoint at time when order commenced trading]
  Prev Close
  Today's Close [=NA if market still open]
Avg % ADV Viewing 'Parent' Orders—Changes to Orders View When the "Executed Orders" radio button is selected (see FIG. 29), the Orders View behaves as described above in the "normal" case where there is no need to distinguish parent orders from executed orders. When the "Parent Orders" radio button is selected, the default/available columns change slightly as shown below. Note that "executed orders" and "slice orders" mean the same thing here, and note that "executed" means "sent to Lehman Brothers for execution," not "filled."

Double-clicking a row in the Executed Orders view brings up the Monitoring Tab and sets the current order to the associated slice order. If a user double-clicks a row in the Parent Orders view for a parent order record that has zero residual size and only one associated slice order, then the Monitoring Tab is displayed and the current order is set to that slice order. If the user double-clicks a row in the Parent Orders view for a parent order record with residual size and at least one associated slice order, or for a parent with 2+ associated slice orders, the Monitoring Tab is displayed and the current order is set to the parent order. If the parent order has no slice orders associated with it, double-clicking the row displays the Execution Tab and sets the current order to the parent order.

Finally, although this is not shown in FIG. 29, parent order rows may be colar-coded to distinguish between (a) totally unallocated orders; (b) partially unallocated parent orders; (c) fully allocated parent orders that are not 100% complete; and (d) parent orders that are 100% complete.

Default Columns
Symbol
Side
Shares
% Alloc [=allocated shares/total shares]
% Filled [=filled shares/total shares]
Slippage [see below]
Additional Columns (optional, default=hidden)
Slices [# slice orders associated with parent]
Alloc % Filled [filled shares/allocated shares]
Load Time [time parent order loaded into SSE]
Filled (shares)
Allocated (shares)
USD Value
USD Allocated
USD Filled
Unfilled (shares)
Unallocated (shares)
Currency
FX
% ADV
Avg Price
Slippage in cents, $, or bps vs various benchmarks:
  Horizon VWAP
  All-Day VWAP
  Horizon Start Price [midpoint at time when order commenced trading]
  Prev Close Today's Close [=NA if market still open]
1-Day Change ($ change in stock price vs previous close)
1-Day % Change (1-Day Change in %)
Mkt Volume (today's volume)
Status (ACK, Working, Filled, CXLed, others?)
% Cons (Filled/market volume during order lifespan)
Average Daily Volume (ADV)
Average Spread
60-day Daily Volatility
Support For Secondary Actions In one embodiment of SSE, the Execution Tab is used only for pre-trade "what if" analysis and subsequent execution of slices of the parent order to Lehman. In an embodiment where SSE is also a monitoring tool for slice orders, the Execution Tab takes on an additional purpose: "what if" analysis/decision support for secondary action decisions ("What is likely to happen if I correct this slice order to 30 minute VWAP?") and then a vehicle for conveying these secondary action decisions to Lehman.

When current order is pointing to a slice order, the Execution tab looks slightly different than for parent orders. This reflects the change of focus from execution to correction. The differences are as follows:

"Execute to Lehman" button changes to "Correct Order." Clicking this button cancels the executed slice and replaces it with an order with the strategy choice, channel choice, and parameter settings shown in the grey dialog area on the left. The user may be alerted if all settings are identical to those of the current order.

When editing slice size, a user can increase the size up to current slice size plus the size of any unallocated portion of the associated parent order. This only applies to slice orders that are smaller than the parent order size. For example, trader sends 100,000 shares from OMS into SSE (the parent order), then executes a 20,000 share slice. A slice order is created in the SSE data structure associated with the parent order. This slice can be corrected up to 100,000 (the slice size plus the residual size of the parent order). If the user executes a second 30,000 slice, then either slice can be corrected up to 50,000 shares.

The Cost/Risk chart is adjusted to incorporate realized cost and risk.

The cost for the graph would be:

[(realized slippage×filled shares)+((realized slippage+ PRISE cost)×unfilled shares)]/total shares, where PRISE cost is the cost estimate given start time now, size=unfilled shares, and duration varies as described above.

The risk for the graph is: [(PRISE risk)×unfilled shares]/total shares, where PRISE risk is the risk estimate given start time now, size=unfilled shares and duration varies as described above.

The projected execution statistics table expands by three additional columns as shown in FIG. 30: Original Projection, Realized, and Projected (Residual). Also, the first column changes name to "Projected (Total)." The "Residual" column (not shown) does not change in definition, although the contents may change if the projection of completion % is revised. Column definitions are given below.

The definitions for each of the cells in the table are as follows:

Original Projection Column

The entries in this column are just snapshot values from the most recent correction (or for the original slice execution if there have been no corrections).

Realized Column
Completion %=Filled shares/slice target size
Execution Cost=(horizon start benchmark−avg price)× (side=buy? 1: −1)
Execution Risk=0
Duration=Elapsed time since start of trading
Completion Time=NA if order still trading;=time of last fill if slice order has finished trading
Consumption Rate=filled/market volume since start of trading Projected (Residual) Column All entries in this column are calculated using the calculations described above except that target size is set to the residual size of the slice order (slice target size−filled shares), and start time is set to current time. For example, if the slice order was a 9:30-2pm VWAP order for 100,000 shares and the user consults the Execution tab at 11am after 44,000 shares have filled, then all of the projected completion statistics are calculated as if the user had submitted a new 11am-2pm VWAP order for 56,000 shares.

Projected Total Column

Projected Total column is calculated by taking sums or averages of the above-described two columns:
Completion %=Realized Completion %+Residual Completion %
Execution Cost=Share-weighted average of Realized Cost & Residual Cost
Execution Risk=Share-weighted average of Realized Risk & Residual Risk
Duration=Realized Duration+Residual Duration
Completion Time=Residual Completion Time
Consumption Rate=(filled shares+projected fills (from "projected residual" calculations))/(market volume since start of trading+projected market volume from now until MIN(must complete time, projected completion time))

Residual Column

This column is not shown in FIG. 30. It is the residual column described above, and is displayed for slice orders as well. As was the case with the Projected Residual column, all definitions of entries in this column are as described above, given that start time=now and target size=slice target size−filled shares.

Figure 9:
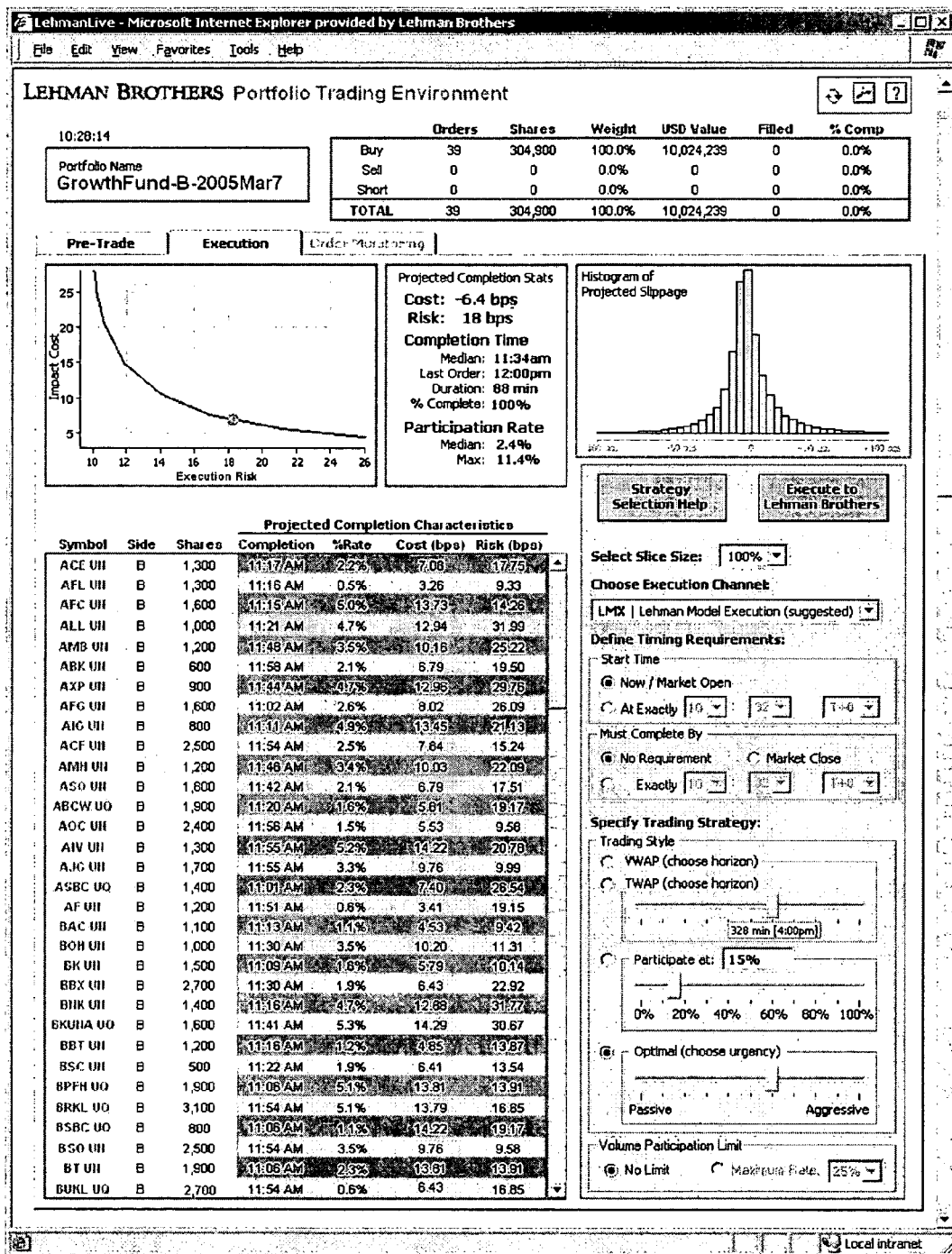
FIG. 9 depicts an exemplary display for a portfolio trading environment.
Figure 31:
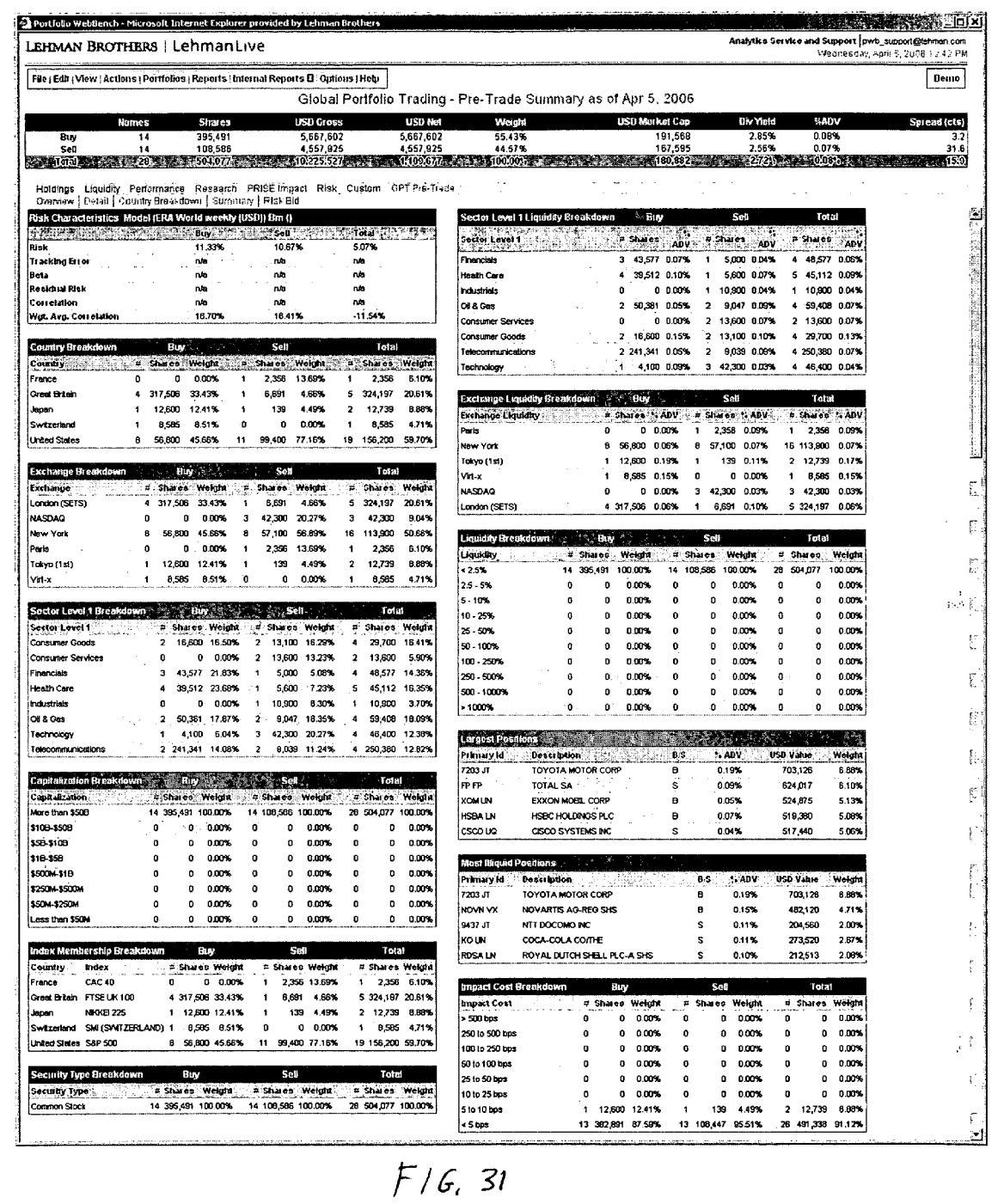

The above description has for the most part described embodiments that pertain to trading a single order in a security. At least one other embodiment allows a user to invoke the application/interface for a basket of orders. Many traders prefer to combine a basket of securities (baskets also are known as lists, programs, or portfolios) into a single trade, and would be better served by this basket-level embodiment rather than by having to enter each security separately. In this embodiment, data, analytics, graphical displays, and strategy selection parameters pertain to the entire basket. See FIG. 31. For example, the analytic nuggets display cost and risk information for execution of the entire basket, a suggested hedge for the entire basket, the most illiquid five names in the basket, and so on. The display also shows breakdowns of liquidity, forecasted transaction costs, and/or risk by various categories, such as exchange, country, sector, price, etc. The Execution tab (containing the Trading Strategy Selector and the Projected Execution Statistics table) is similarly reconfigured to show a combination of basket-level and security-level information. See FIG. 9. The Trading Strategy Selector is further augmented to add controls allowing a user to provide additional basket-level instructions, such as to maintain dollar-neutrality for the basket within some threshold, or to minimize tracking error relative to some index subject to some transaction cost constraint. The Projected Completion Statistics preferably are broken into two sections. One section shows the projected cost, risk, completion time, and consumption rate for the aggregate basket. A second section provides the same information at a security-by-security level. The Monitoring Tab provides the same information and graphs as the single-stock Monitoring Tab, but shows statistics and data at the aggregated basket level.

LMX is Lehman Brothers' suite of model-driven order execution strategies. LMX strategies are designed to reduce market impact and deliver strong performance relative to the desired benchmark. These algorithms are available as strategies from the invention, but they are not part of the invention.

Those skilled in the art will be familiar with the various trading strategies that can be accessed from the invention, including the strategies explicitly mentioned herein. However, for those not skilled in the art, some additional information regarding some of the more easily explained strategies is provided below.

VWAP stands for volume-weighted average price. This is the average price for the stock over a specified time horizon, with more weight given to periods of heavier trading. The VWAP over any time period is the result of dividing total dollar volume by total share volume over that time period.

TWAP stands for time-weighted average price, and is a simpler way of averaging a stock price over a specified time period. Calculating a TWAP entails dividing the time period into intervals (e.g., minutes), taking a snapshot of the stock price at the end of each interval, and then averaging those interval prices. No extra weight is given to any one interval, even if an extraordinary number of shares were traded during that interval.

The main goal of a VWAP strategy is to minimize slippage relative to the VWAP benchmark over the selected time period. This is achieved by constructing a trading profile that matches expected market liquidity over time and allocating a greater share of the order to the periods of the day that typically attract the highest levels of market activity. The strategy releases slices of the order using this trading profile as a roadmap and continuously monitors short-term indicators to optimize order timing and pricing.

The goal of the TWAP strategy is to trade with minimal shortfall relative to a TWAP benchmark. The TWAP strategy trades at a constant rate during the time period, participating evenly so that the percent of the order that is filled at any time during the period matches the percentage of the time period that has elapsed.

Thus, the TWAP strategy trades at a rate linearly proportional to elapsed time, spreading the trade evenly across a time period. On the other hand, the VWAP strategy tracks an expected volume profile, overweighting the portions of the day that correspond to heaviest trading.

The objective of the With Volume strategy is to trade in proportion to actual market activity, targeting participation at a certain percentage of overall traded volume. This strategy is also commonly known as a Percent Of Volume (POV) strategy. The user specifies a participation target (a percentage) and the strategy tracks the participation target, reacting to actual activity but regulating actions to avoid information leakage and market impact. For example, if the desired target is 10%, then the strategy will begin trading at the Start Time and will thereafter endeavor to trade the order such that the shares filled for the order represent 10% of all volume executed on the market since the Start Time.

The Target Strike strategy is designed to minimize implementation shortfall (slippage relative to the security price at the order arrival time). The user specifies an urgency level and then the strategy uses this urgency level to calculate an optimal trade horizon to balance price impact against price risk. Once this optimal horizon has been calculated, the strategy spreads the trade over this horizon, matching orders to expected liquidity.

Various embodiments described herein are not intended to be mutually exclusive; those skilled in the art will recognize that various combinations of these and other embodiments are within the scope of the invention. Although the present invention has been illustrated and described herein with respect to various embodiments, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A system comprising:
   one or more processors programmed to:
   receive a securities order from a user;
   display market intelligence information regarding one or more securities;
   provide an interface;
   receive, via the interface, data describing one or more trading strategies and strategy requirements for said securities order specified by said user;
   calculate projected order completion information for said order based on said received data describing one or more trading strategies and strategy requirements for said securities order specified by said user; and
   display to said user said projected order completion information.

2. A system as in claim 1, wherein said one or more processors are further programmed to receive from an order management system data identifying said one or more securities.

3. A system as in claim 1, wherein said one or more processors are further programmed to display liquidity information regarding said one or more securities.

4. A system as in claim 1, wherein said one or more processors are further programmed to display performance information regarding said one or more securities.

5. A system as in claim 1, wherein said one or more processors are further programmed to display execution risk information regarding said one or more securities.

6. A system as in claim 1, wherein said one or more processors are further programmed to display order execution strategy information for said securities order.

7. A system as in claim 1, wherein said one or more processors are further programmed to provide an interface for accepting user specification of one or more order timing requirements for said securities order.

8. A system as in claim 1, wherein said one or more processors are further programmed to provide an interface for accepting user specification of one or more order execution channels for said securities order.

9. A system as in claim 1, wherein said one or more processors are further programmed to provide an interface for sending an order directly to an order execution system.

10. A system as in claim 1, wherein said one or more processors are further programmed to provide a basic order information display.

11. A system as in claim 1, wherein said one or more processors are further programmed to provide an interface for accepting user edits of at least one of: order size and price limit.

12. A system as in claim 1, wherein said interface comprises one or more VWAP and TWAP strategies.

13. A system as in claim 12, wherein said interface accepts user specification of one or more trading horizons for said user-specified VWAP and TWAP strategies.

14. A system as in claim 1, wherein said interface accepts user specification of one or more trading strategies comprising one or more With Volume strategies.

15. A system as in claim 14, wherein said interface accepts user specification of one or more volume participation target rates for said user-specified With Volume strategies.

16. A system as in claim 1, wherein said interface accepts user specification of one or more trading strategies comprising one or more Target Strike strategies.

17. A system as in claim 16, wherein said interface accepts user specification of one or more urgency levels for said user-specified Target Strike strategies.

18. A system as in claim 1, wherein said interface accepts user specification of a participation ceiling.

19. A system as in claim 1, wherein said projected order completion information comprises one or more of: completion percent, execution cost, execution risk, duration, completion time, and consumption rate.

20. A system as in claim 1, wherein said projected order completion information comprises residual order information.

21. A system as in claim 20, wherein said residual order information comprises at least one of: residual percent, residual cost, residual risk, and total risk.

22. A system as in claim 1, wherein said projected order completion information comprises impact versus execution risk tradeoff information.

23. A system as in claim 22, wherein said impact versus execution risk tradeoff information is displayed as a chart.

24. A system as in claim 1, wherein said projected order completion information comprises impact cost information.

25. A system as in claim 24, wherein said impact cost information is displayed as a chart.

26. A system as in claim 1, wherein said one or more processors are further programmed to monitor and display order progress and performance information.

27. A system as in claim 26, wherein said one or more processors are further programmed to display order and slice information comprising symbol, side, slice size, and strategy.

28. A system as in claim 26, wherein said one or more processors are further programmed to display quote information and VWAP.

29. A system as in claim 26, wherein said one or more processors are further programmed to display real time order progress data.

30. A system as in claim 29, wherein said real time order progress data comprises at least one of: percent filled, average price, unrealized average price, and percent consumption.

31. A system as in claim 26, wherein said one or more processors are further programmed to display a trading conditions summary.

32. A system as in claim 31, wherein said trading conditions summary comprises information regarding at least one of: volume, volatility, and spread over horizon.

33. A system as in claim 26, wherein said one or more processors are further programmed to display a chart showing price versus VWAP.

34. A system as in claim 26, wherein said one or more processors are further programmed to display a chart showing actual versus expected volume.

35. A system as in claim 1, wherein said one or more processors are further programmed to display order progress and performance information for a plurality of orders.

36. A computer readable storage medium having stored thereon computer executable instructions that, when executed on a computer, configure the computer to perform a method comprising:
   receiving from a user data specifying a securities order;
   displaying market intelligence information regarding one or more securities;
   receiving data describing one or more trading strategies and strategy requirements for said securities order specified by said user;
   calculating projected order completion information for said order, based on said received data describing one or more trading strategies and strategy requirements for said securities order specified by said user; and
   displaying to said user said projected order completion information.

37. A computer readable storage medium as in claim 36, wherein said data describing user specification of one or more trading strategies and strategy requirements for said securities order comprises data describing user specification of one or more trading strategies comprising one or more VWAP and TWAP strategies.

38. A computer readable storage medium as in claim 37, wherein said data describing user specification of one or more trading strategies and strategy requirements for said securities order comprises data describing user specification of one or more trading horizons for said user-specified VWAP and TWAP strategies.

39. A computer readable storage medium as in claim 36, wherein said data describing user specification of one or more trading strategies and strategy requirements for said securities order comprises data describing user specification of one or more trading strategies comprising one or more With Volume strategies.

40. A computer readable storage medium as in claim 39, wherein said data describing user specification of one or more trading strategies and strategy requirements for said securities order comprises data describing user specification of one or more volume participation target rates for said user-specified With Volume strategies.

41. A computer readable storage medium as in claim 36, wherein said data describing user specification of one or more trading strategies and strategy requirements for said securities order comprises data describing user specification of one or more trading strategies comprising one or more Target Strike strategies.

42. A computer readable storage medium as in claim 41, wherein said data describing user specification of one or more trading strategies and strategy requirements for said securities order comprises data describing user specification of one or more urgency levels for said user-specified Target Strike strategies.

43. A computer readable storage medium as in claim 36, wherein said data describing user specification of one or more trading strategies and strategy requirements for said securities order comprises data describing user specification of a participation ceiling.

44. A computer readable storage medium as in claim 36, wherein said projected order completion information comprises one or more of: completion percent, execution cost, execution risk, duration, completion time, and consumption rate.

45. A computer readable storage medium as in claim 36, wherein said projected order completion information comprises residual order information.

46. A computer readable storage medium as in claim 45, wherein said residual order information comprises at least one of: residual percent, residual cost, residual risk, and total risk.

47. A computer readable storage medium as in claim 36, wherein said projected order completion information comprises impact versus execution risk tradeoff information.

48. A computer readable storage medium as in claim 47, wherein said impact versus execution risk tradeoff information is displayed as a chart.

49. A computer readable storage medium as in claim 36, wherein said projected order completion information comprises impact cost information.

50. A computer readable storage medium as in claim 49, wherein said impact cost information is displayed as a chart.

51. A computer readable storage medium as in claim 36, the method further comprising monitoring and displaying order progress and performance information.

52. A computer readable storage medium as in claim 51, the method further comprising displaying order and slice information comprising symbol, side, slice size, and strategy.

53. A computer readable storage medium as in claim 51, the method further comprising displaying quote information and VWAP.

54. A computer readable storage medium as in claim 51, the method further comprising displaying real time order progress data.

55. A computer readable storage medium as in claim 54, wherein said real time order progress data comprises at least one of: percent filled, average price, unrealized average price, and percent consumption.

56. A computer readable storage medium as in claim 51, the method further comprising displaying a trading conditions summary.

57. A computer readable storage medium as in claim 56, wherein said trading conditions summary comprises information regarding at least one of: volume, volatility, and spread over horizon.

58. A computer readable storage medium as in claim 51, further comprising displaying a chart showing price versus VWAP.

59. A computer readable storage medium as in claim 51, further comprising displaying a chart showing actual versus expected volume.

60. A computer readable storage medium as in claim 36, further comprising displaying order progress and performance information for a plurality of orders.

\* \* \* \* \*